United States Patent [19]

Cheriton

[11] Patent Number: 5,666,514
[45] Date of Patent: Sep. 9, 1997

[54] CACHE MEMORY CONTAINING EXTRA STATUS BITS TO INDICATE MEMORY REGIONS WHERE LOGGING OF DATA SHOULD OCCUR

[75] Inventor: David R. Cheriton, Palo Alto, Calif.

[73] Assignee: Board of Trustees of the Leland Stanford Junior University, Stanford, Calif.

[21] Appl. No.: 270,655

[22] Filed: Jul. 1, 1994

[51] Int. Cl.$^6$ ................................................. G06F 12/08
[52] U.S. Cl. ........................................... 711/144; 711/141
[58] Field of Search .................................... 395/444, 445, 395/446, 460, 468, 469, 470, 471, 472, 182.13, 182.17, 182.18

[56] References Cited

U.S. PATENT DOCUMENTS

| | | | |
|---|---|---|---|
| 4,442,487 | 4/1984 | Fletcher et al. | 395/449 |
| 5,276,851 | 1/1994 | Thack et al. | 395/447 |
| 5,325,504 | 6/1994 | Tipley et al. | |
| 5,404,489 | 4/1995 | Woods et al. | |

OTHER PUBLICATIONS

Handy, "The Cache Memory Book," 1993, pp. 62–73.
Douglis, Fred et al., "Log–structured File Systems", Compcon Spring 1989 IEEE Comp. Soc. Int'l. Conf., pp. 124–129.
Cheriton et al., "ParaDiGM: A Highly Scalable Shared–Memory Multi–Computer Architecture," *IEEE Computer*, Feb. 1991 pp. 1–19.
Cheriton et al., "The VMP Multiprocessor: Initial Experience, Refinements and Performance Evaluation," *15th Symposium on Computer Architecture*, Jun. 1988, pp. 1–24.
Cheriton et al., "Multi–Level Shared Caching Techniques for Scalability in VMP-MC," *International Symposium on Computer Architecture*, Jun. 1989, pp. 1–18.
Fujimoto et al., "Design and Evaluation of the Rollback Chip: Special Purpose hardware for time Warp," *IEEE Transactions on Computers* (1992) 41:68–82.
Lee et al., "Design and Evaluation of a Fault–Tolerant Multi–processor Using Hardware Recovery Block," *IEEE Transactions on Computers* (1984) C–33:113–124.
Chandy et al., "Rollback and Recovery Strategies for Computer Programs," *IEEE Transactions on Computers* (1972) C–21:546–556.
Buzzell et al., "Modular VME Rollback Hardware for Time Warp," Unknown Journal, approximately 1989, pp. 153–156.
Li et al., "Real–Time, Concurrent Checkpoint for Parallel Programs," Unknown Journal, 1990, pp. 79–88.
Fujimoto, "the Virtual Time Machine," Unkown Journal, 1989, pp. 19–208.
Fujimoto et al., "Design and Performance of Special Purpose Hardware for Time Warp," IEEE (1988) pp. 401–408.

*Primary Examiner*—Eddie P. Chan
*Assistant Examiner*—Kevin L. Ellis
*Attorney, Agent, or Firm*—Townsend and Townsend and Crew LLP

[57] ABSTRACT

The present invention provides a digital computer memory cache organization for efficient data logging, log-based copy and rollback, high-performance I/O, network switching and multi-cache consistency maintenance. The cache organization implements efficient selective cache write-back, mapping and transferring of data. Write or store operations to cache lines tagged as logged are written through to a log block builder associated with the cache. Non-logged store operations are handled local to the cache, as in a writeback cache. The log block builder combines write operations into data blocks and transfers the data blocks to a log splitter. A log splitter demultiplexes the logged data into separate streams based on address.

10 Claims, 27 Drawing Sheets

CACHE MEMORY CONTAINING EXTRA STATUS BITS TO INDICATE MEMORY REGIONS WHERE LOGGING OF DATA SHOULD OCCUR

BACKGROUND OF THE INVENTION

This invention relates generally to the organization of digital computing apparatus and more specifically the recording or logging of memory updates in support of auditing, recovery, device output, networking and multiple cache consistency maintenance.

Data Logging

Data logging or logging is the recording of data values generated by, and concurrent to, the execution of some generating process. Logging is used in database management systems to record updates to the database to facilitate recovery in the case of a system crash or media failure. It is also used to record the previous value of a record before an update so that the change can be undone. Logging is used in computer simulation to provide a record of the activity of the simulated system for subsequent processing and analysis, as an aid to debugging the system, and to implement rollback in so-called optimistic simulation where it may be necessary to undo actions that have progressed too far ahead in virtual time. Also, logging is used to record actions performed by a system so that these actions can be monitored and reviewed as part of security auditing.

Logging has been implemented in two well-established ways. First, the program can be modified either manually by a programmer or by an language processor to generate a write operation to a log buffer area for every data write operation occurring in the program. This approach is commonly used with database management systems, program debugging, and simulation systems. FIG. 1 shows this organization. An application process 101 performs a data write operation to the program data area 103. In conjunction with this data write operation, the application process 101 also performs a log data write to the log buffer area 105 consisting of the datum and possibly the address of the data write operation.

In the second approach, the memory mapping hardware can be set to write-protect the area of memory to be logged, normally with the aid of the operating system. Subsequently, a write operation to this area of memory causes a trap to a trap handler software routine which determines the address and datum being written, transfers that information to the log buffer, completes the write operation, and allows the program to continue execution. Mechanisms to implement this approach are provided in commercial operating systems such as the ATT Unix system by the mmap, mprotect, and signal facilities.

Basic Cache Design

Computer system designers have recognized the advantages of employing a fast cycle time cache memory unit or cache intermediate between the longer cycle time main memory and the processing unit or units. Caches are structured as a plurality of fixed-sized lines, the unit of transfer between the cache and main memory, with an associative table or directory, with a status control word or tag per line, indicating the validity of the line, read and write permissions, its associated main memory address, and possibly other information. Additional directory information has been used to ensure consistency between the cache information and main memory and possibly other caches in the system. The cache control module manages the contents of the cache memory unit and the cache directory in response to memory references by its associated processor (s) and bus or network interconnect. Each cache line holds one memory block, a portion of memory of size equal to the size of the cache line, and starting on an address that is a multiple of this size. A processor is coupled to a cache so that memory references are handled by the cache, rather than requiring the memory references to be communicated to the main memory system.

FIG. 2 shows this basic cache structure. A processor 202 refers to an address as part of a read or write operation by signaling the address and the operation over bus interconnect 203 to cache memory unit 204, in particular cache controller 206. Cache controller 206 looks up the address in cache directory 208 to locate the corresponding status control word 210. If the corresponding status control word 210 is present in cache directory 208, referred to as a cache hit, this status control word 210 indicates the corresponding cache line 216 in the cache line memory 212 containing the referenced datum. If the operation is a write operation, the datum to be written is transmitted over from processor 202 over data busses 214 and 203 into cache line 216. The datum value may or may not be propagated over bus 218 to the memory system (not shown), depending on whether that cache line is handled as write-through or write-back, as described in the next section.

If the corresponding status control word 210 is not present in cache directory 208, referred to as a cache miss, the cache control module 206 selects a cache line 216 to hold this memory block, writes the data currently contained in this line back to memory if it has been modified since the last such writeback, loads the required data from memory into this line, sets the corresponding status control word 210 to reflect the new contents of the cache, and allows the processor 202 to continue, completing the operation as for a cache hit described above.

Multi-level cache structures have also been used. The first level or L1 cache is directly connected to the processor to handle each memory access. The first level cache is connected to a second level cache (L2), rather than being connected to main memory. When a memory reference misses in the L1 cache, the L1 cache controller sends a request for the referenced block of memory to the L2 cache. If the L2 cache contains the referenced memory block, the L2 cache returns this data to the L1 cache, the same as the case of a cache hit described above. Otherwise, the reference is a miss at the L2 cache, and is handled the same as described for the cache miss case above. In particular, the L2 cache controller requests the data from the next lower level of cache or memory to which it is connected. Multi-level caching has been described in several published reports; One recent report is: ParaDiGM: A Highly Scalable Shared Memory Multi-Computer Architecture" by Cheriton et al. in IEEE Computer, February 1991.

Cache Writing Methods

Write operations modify the state of the cache, potentially making it inconsistent with the copy of the corresponding location in main memory. Two common approaches are used to ensure that main memory is eventually updated by writes to a cache line. In the first approach, the write-through approach, any write operation to the cache causes the cache to immediately write this same value into the memory system. Thus, memory is always current and the cache serves only to handle read operations in place of the memory system.

In the second approach, the write-back approach, write operations only immediately update the contents of the associated cache line, not main memory. The status control word for the cache line is then set to indicate that the cache line has been modified. When a cache line is to be invalidated (because it is to be used for a different portion of memory), or any other need arises to make the main memory consistent with the cache, the data in the cache line is then written back to the memory block associated with this cache line.

Caches may provide fixed or selectable address range or set of address ranges which are non-cached. When a processor writes to a non-cached portion of memory, the write operation is passed through immediately to the main memory system and does not affect the state of the cache. Read operations to addresses within the designated non-cached ranges are handled similarly, bypassing the cache and retrieving the requested data from the memory system.

Non-cached regions of memory are frequently used to access I/O devices such as network interfaces, graphical frame buffers, and various storage device interfaces. The non-cached behavior ensures that all writes are immediately transferred to the device. It also ensure that read operations return the current state of status registers and other device states that may change without the processor modifying this state, an example being a device completion flag. Non-cached access is also used on occasion to handle large areas of memory that are written but not read immediately, such as a log buffer. This approach avoids using a large number of cache lines to hold this data, frequently forcing the cache to discard other data that it is accessing, causing a significant performance penalty.

Caches and processors may provide an explicit mechanism for forcing modified cache lines to be written back or flushed to main memory. Explicit flushing can be used in place of non-cached access in some cases. The cache lines are written and then the modified data is flushed back to the memory to update the device or memory, converging to the situation achieved with a non-cached memory approach. However, this approach is frequently infeasible because the cache may write back a memory block at any time to make space for other memory blocks being referenced by the processor activity, so explicit cache flushing is not guaranteed to cause write back in the required order of data transfer.

Finally, caches may provide write buffers that accept the data to be written, either by the processor directly on a non-cached or write-through operation, or as part of a cache line writeback, normally allowing the processor or cache to proceed before the data has been transferred to the memory system. Write buffers are an established mechanism for minimizing the delay on the cache and processor operation imposed by writing data to the memory system. Write buffers have been used directly as part of the processor to absorb write data, as part of write-through caches and as part of write-back caches to absorb cache line write data.

Memory Copy and Rollback Support

An operating system facility known as copy-on-write (and also as deferred copy) provides a functionality with some relevance to logging. With a copy-on-write facility, a virtual memory source segment is logically copied to a destination segment by mapping the first segment to the destination segment, using virtual memory mapping hardware. The actual copy only occurs on a page basis at the point that a process first attempts to write to a page in the destination segment. At that time, the source page corresponding to the referenced page is copied to the destination segment before the write completes, modifying the destination segment. Subsequent read and write operations within this page go directly to the page in the destination segment. Thus, the copy-on-write facility "logs" modifications to the source segment but on the granularity of a page. That is, the modified page and its modifications are recorded in the destination segment area. This mechanism for logging and copying suffers from the major disadvantage of the page being an excessively large unit. A scheme was proposed by Cheriton et al. (The VMP Multiprocessor: Initial Experience, Refinements and Performance Evaluation, Int. Symposium on Computer Architecture, 1988) that provided this facility at the cache line level. However, that proposal relied on software-controlled virtually addressed caches, not a common computer system architecture.

An application-level variant of this copy-on-write mechanism has been used to implement checkpointing and rollback, or resetting to the checkpoint. (See Li et al., Concurrent real-time checkpoint for parallel programs, 2nd ACM SIGPLAN Symp. on Principles and Practice of Parallel Programming, March 1990 as well as S. Feldman and C. Brown, IGOR: A system for Program Debugging via Reversible Execution, ACM SIGPLAN Notices, January 1989.) In this scheme, a checkpoint consists of copying the modified pages, identified by the virtual memory mechanism, to a separate memory area or to secondary storage, and rollback consists of restoring the address space to the state in a previous checkpoint. In particular, the memory mapping unit is only used to trap to software on a write operation, at which point a full page copy is performed. Checkpoints are created by a conventional copy of each modified page and rollback is performed by copying back all pages modified since the last checkpoint, thereby incurring a significant copying cost.

Device I/O and Network Switching Techniques

Conventional device output is performed by operating system calls that copy the data from the application memory area to the device. In some cases, the device interface is accessed as a portion of the memory address space, allowing the processor to copy the application data directly into the device interface. In other cases, the application data are copied to a system memory area from which the data are then transferred by the hardware device controller using direct memory access (DMA). The former scheme normally requires that the processor access the device memory area as uncached memory and transfer the data one word at a time over the memory bus. The latter normally requires an extra copy of the data over the memory bus, once to transfer to the system area and a second transfer as part of the DMA operation. These copy operations impose a significant performance overhead when used with high-performance output devices.

Device input is conventionally performed by transferring the data to a system memory area and then copying the data to the application memory area as part of a system call requesting the data, thus incurring two copies of the data. The copy from the device to system memory is required because the data cannot be stored in the limited memory on the device interface, in the case of so-called programmed I/O (considering that the application may not have yet requested the data), or because the device is using DMA to transfer to memory and the system cannot easily direct the DMA into the application memory (because of paging complications or the application has not allocated the memory yet). Again, the extra copies impose a performance overhead when used with high-performance input devices.

Some device interfaces allow the device to be mapped into the application address space and accessed directly, a graphics framebuffer being a familiar example. However, it is difficult to implement safe shared access to a device using mapping because the device memory area cannot generally be divided into page units such that the pages mapped into one application only contain data for that application. This is particularly true for network input, where the interface cannot conventionally determine which application is to receive the arriving data without substantial software intervention.

Network switching can be viewed as a special case of device I/O in which the device input is directed to the output of another device, namely the network output port. There is a broad range of literature and products in network switching. Basically, an addressed data unit or packet is received over a communication link and the receiving computer or switching device determines the output link on which to transmit this packet, and proceeds to transmit this packet on this output link. There are several basic approaches to effecting this switching.

First, using a switch with a computer processor, the processor is notified of packet arrival, examines the packet and possibly other routing information to determine the output line for the packet, and copies the packet from its input location to a transmission buffer for the output line, instigating the transmission of the data packet on the output line. With this approach, the switching and packet movement from input to output is accomplished by the processor operation according to software instructions. This scheme entails essentially device input and device output as described above, but perhaps eliminating the step of copying to and from a separate application memory area.

Second, specialized hardware can be provided that connects the input line to the output line, either statically by prior setup as with circuit switching or dynamically in response to parsing of the packet. The ATT Batcher-Banyon switching fabric is one example of a mechanism desired to be realized as such specialized hardware.

Finally, the input line device can write the input packet over a switching bus, with some designating address, such that one or more output devices recognize said address and copy the data so transmitted out on their associated transmission line. The ATT Bell Laboratories Datakit networking technology is an example of a specialized network using this approach of short bus switching, which, in the case of this particular example, uses circuit switching end one word packets.

In summary, this prior art principally achieves a software implementation of switching or a implementation in specialized hardware. No prior art shows how to support network switching by an extension of general-purpose computer system structures, as provided herein.

Cache Consistency Techniques

Cache consistency problems arises because, with caching, there is potentially a separate copy of the data in both the cache and main memory. A mechanism is normally needed to ensure that the processor(s) and I/O devices read and update these multiple copies in a consistent fashion so that read operations return the latest data, and write operations take effect in basically the order they were issued. There may also be multiple caches to support multiple processors and multiple levels of access to memory, further complicating the consistency problem.

There are two basic established approaches to consistency. In the first approach, the cache uses the write-through cache operation described above. When the processor writes a datum to the cache, the datum is transferred through immediately to the memory system, notifying other caches holding a copy of this datum, either explicitly or implicitly (by the other caches observing this write operation on a shared bus) of the update. Other caches holding a copy of this datum either update the copy of this datum in their cache with the written datum value or else invalidate the cache line in their cache containing the copy of this datum, thereby forcing a subsequent read access to this address to retrieve the updated datum value from the next level of memory, either main memory or a lower-level cache.

The write-through cache imposes an excessive write traffic load on the memory bus and memory store and requires a high-speed so-called bus snooping mechanism to update other caches in response to these write operations. As a refinement, IBM U.S. Pat. No. 4,442,487 describes an arrangement wherein a cache is made selectively write-through by incorporating a shared bit per status control word in the cache directory that is set when the bus snooping mechanism observes another cache loading the same memory block or when it is notified on a cache line load that the memory block is already present in another cache. This approach reduces the write traffic with small caches but has been observed to incur excessive write traffic with larger cache lines because a significant amount of data is resident in multiple caches after a period of execution time.

In the second approach, the so-called write-back or copy-back approach, ownership information is maintained about cache lines, either by each cache or by the memory system. When a processor writes a datum to an address, the cache first checks that it has exclusive ownership of the associated cache line before allowing the write operation to proceed. If it does have exclusive ownership, the operation proceeds as above. If the processor does not have exclusive ownership, the write operation and the processor are suspended, the cache requests exclusive ownership of the cache line from the memory system, loading the cache line if not present in the cache, and then allows the write operation and the processor to proceed once the line is present and its holds exclusive ownership. A cache may be requested to relinquish ownership of a cache line or may relinquish ownership when replacing a cache line as part of loading a second cache line. In both cases, a cache line that is modified is written back in its entirety to main memory (and/or other caches in the system) before the cache releases its exclusive ownership of the memory block. When a processor reads a datum from an address, the cache first checks that it has ownership of the corresponding cache line, thereby ensuring it has the more recent data in the cache line. If it does have ownership, the operation proceeds as above. If it does not have ownership of the cache line, the read operation and the processor are suspended, the cache requests ownership of the cache line from the memory system, loading the cache line if not present in the cache, and then allowing the read operation and the processor to proceed once the line is present and it is holding ownership. A read operation can either use the same exclusive ownership required for write operations or an additional shared ownership mode which allows multiple processors and caches to read the data concurrently. The latter scheme effectively implements the well-known readers/writers algorithm used in operating systems to maintain consistency of data structures. Additional cache directory information, such as ownership and "modified" flags are added to the cache status control words in the cache directory to implement these protocols.

Write-back caches are recognized to handle infrequently shared data with less bus traffic than write-through caches but produce excessive read and write traffic when there are higher degrees of write sharing. This traffic is required to maintain consistency of the copies in the various caches and memory. The Motorola MC 68040 microprocessor provides a cache directory flag that selects either write back or write-through behavior on a page by page basis.

To reduce the overhead of consistency maintenance, such as the delay in acquiring exclusive ownership of a memory block, various research reports have proposed using various "relaxed" forms of consistency mechanisms, in which a strictly sequential ownership regime is not enforced or required. For example, a computer system may only ensure that ownership transfer has been fully synchronized at the point that locks are acquired or locks are released, so called release consistency developed by the DASH Project at Stanford University. Even more extreme, a cache can ignore the ownership protocol altogether and simply reread cached data from memory periodically to bring it up to date, with no coordination to other caches.

In general, the prior art in logging, caching, network switching and cache consistency has addressed the narrow aspects of their problem domains, and failed to provide a uniform mechanism that is applicable to the broader range of high-performance logging, device output and cache consistency.

SUMMARY OF THE INVENTION

The present invention obviates many of the deficiencies of prior approaches. In accordance with the teachings of the present invention, a digital computer system is configured such that one or more regions of memory can be marked as being logged and a log memory area can be associated with each logged region using a mapping mechanism. When a write reference is made to a memory unit within such a logged region, the address provided as part of the write operation is mapped to a location within the log memory area and the datum and possibly the address of the write operation are stored in the log memory area. The mapping is then updated according to the mode of logging and the size of datum written to the log memory area.

Log cache copy support is provided by extending the cache address mapping mechanism with a source address from which the source data may be loaded, thereby effecting a copy as part of cache load and writeback, the writeback only taking place when the cache data is modified thus implementing a "log copy" rather than a conventional memory copy.

The present invention provides a combination of the cache-based logging and log copy mechanism to implement fine-grained memory rollback and rollforward, as occurs in parallel simulation and database transactions.

Device output for an output device that is accessed as a portion of memory is implemented by specifying the log buffer address range to be that associated with said device, and by writing data to the portion of memory logged to this address. Networking switching is achieved by providing the above logging support to input network devices, wherein each word of a received packet is translated to a write operation on the log cache at the input device and the resulting log traffic is directed to the desired network output device, which includes a snoop mechanism for noticing and acquiring the data written to the log.

In a multiple processor system with multiple caches, multiple copies of logged cache lines are maintained consistent by updating these cache lines from the log blocks generated by the above mechanism. If strict cache consistency is required, a conventional ownership protocol can be implemented by the caches to limit activity to one writer or multiple readers on each cache line. Ownership transfer is synchronized with log data transfer and corresponding cache updates.

A further understanding of the nature and advantages of the invention will become apparent by reference to the remaining portions of the specification and drawings.

DESCRIPTION OF SPECIFIC EMBODIMENTS
CONTENTS

I. General
II. L1 Cache
III. Log Block Builder
IV. Log Copy Cache
V. Software Embodiment of Logging
VI. Log-Based Rollback Recovery
VII. Device Output
VIII. Device Input
IX. Log-Based Consistency
X. Conclusion I. General In overview, the present invention provides devices and methods to extend computer organization and program execution methods to provide efficient data logging, applicable to device I/O, network switching and inter-cache consistency as well as conventional uses of data logging.

Figure 3:
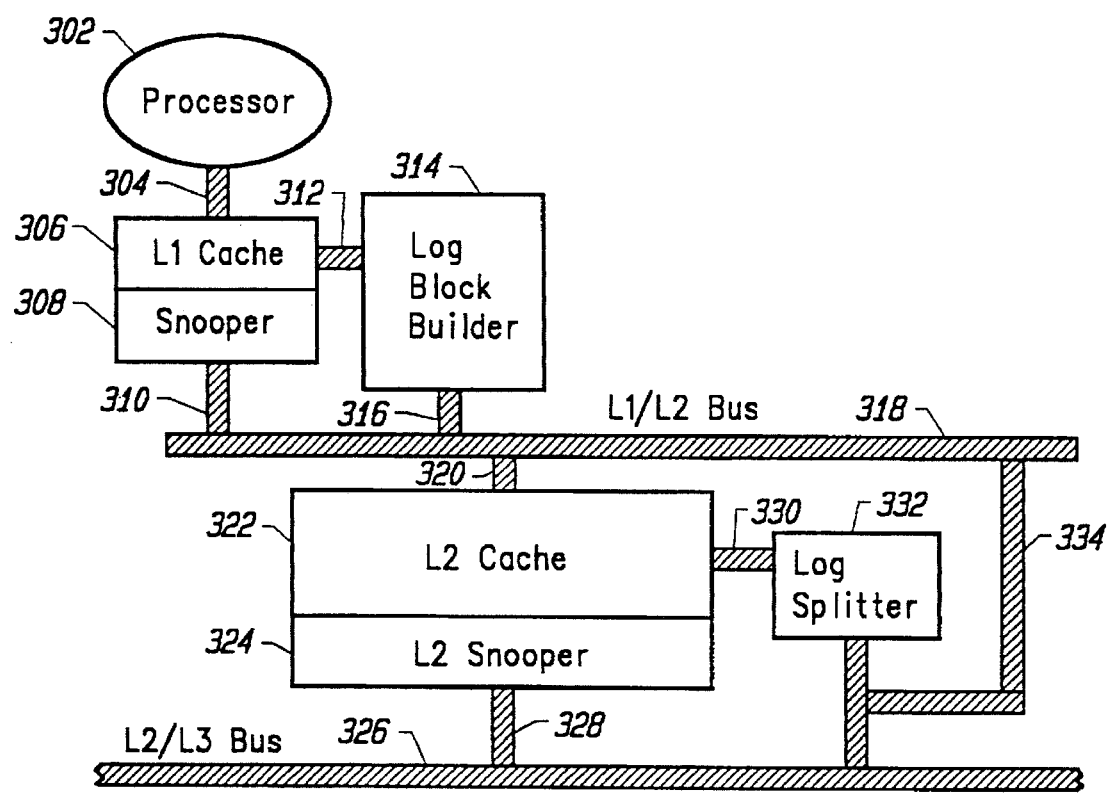
FIG. 3 shows the basic system organization with a processor, cache memory unit, log block builder, log FIFO and log splitter at the secondary cache level, where the L2/L3 bus either connects the L2 caches to memory or to another level of memory caching, or to I/O devices.

FIG. 3 illustrates the organization of a system in which the present invention finds use. A processor 302 is connected by a bus 304 to a first-level or L1 cache 306 and a cache snooper component 308, which is then connected to a L1/L2 bus 318 by a bus interconnect 310. The L1 cache 306 is connected by a bus 312 to a log block builder (LBB) 314 which is in turn connected to the L1/L2 bus 318 by a bus interface 316. A secondary or L2 cache 322 is connected by a bus interface 320 to the L1/L2 bus 318 and through a L2 snooper 324 and bus interface 328 to a L2/L3 bus 326. An interconnect 330 connects L2 cache 322 to a log splitter 332. The log splitter connects by an interconnect 334 to L1/L2 bus 318 and to L2/L3 bus 326. The system communicates with a system memory and one or more external memories (not shown), both of which may be part of the same physical device.

When processor 302 writes to a cache line marked as logged in L1 cache 306 (to be described in association with FIG. 4), the address and datum pair of the write operation is output across interconnect 312 to LBB 314. The LBB incorporates this pair into a log block comprised of address and one or more data values, and outputs the log block over interconnect 316 to L1/L2 bus 318. The L2 cache 322 receives this log block from L1/L2 bus 318 over bus interface 320 and both updates the L2 cache contents with this data and passes the log block over bus 330 to log splitter 332. Log splitter 332 maps the log block to a log buffer address and transfers the block with the revised address, possibly including the original address, over interconnect 334 to L1/L2 bus 318 and L2/L3 bus 326. The revised log block is received by snooper 308 which updates the cache line in L1 cache 304 corresponding to the revised log block address, if this line is present. If the line is not present, the revised log block transmission is ignored by L1 cache 304. The revised log block is also received by L2 snooper 324, which updates the cache line in L2 cache 322 corresponding to the revised log block address, if this line is present. If the line is not present in L2 cache 322, the revised log block transmission is ignored by L2 cache snooper 324. Other caches and devices may be connected to L1/L2 bus 318 and L2/L3 bus 326, and thus receive the revised log block as well.

The snooper 308 can be omitted from a system design if L1 cache 306 consistency is maintained by a separate mechanism, such as invalidation signals generated by the L2 cache 322 or by explicit software-directed cache flushing and invalidation. In a particular embodiment, the log splitter 332 can be directly connected to the LBB 314 if there is no need to share this module. In another particular embodiment, the log splitter 332 can be omitted or incorporated into the LBB 314 particularly if the log mapping required is minimal.

The following subsections describe the design and operation of the particular embodiment in greater detail. The processors mentioned in the description contain conventional instruction acquisition and execution circuits (not shown) commonly found in the processing elements of digital computer systems. For simplicity of description, the particular embodiment is described using bus technology for interconnection of components. The present invention can also be realized using interconnection networks, which would be applicable for larger scale configurations of systems using the invention than described herein.

II. L1 Cache

Figure 1:
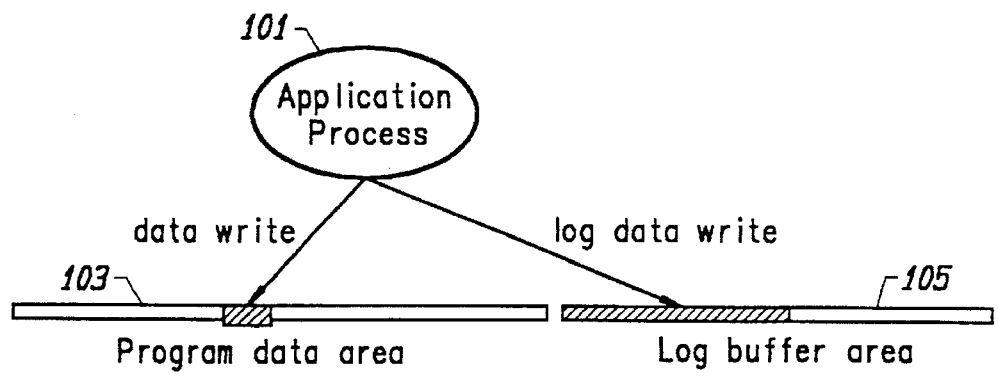
FIG. 1 shows an application process logging updates to its data area by writing both to the data area and to a log buffer area.
Figure 2:
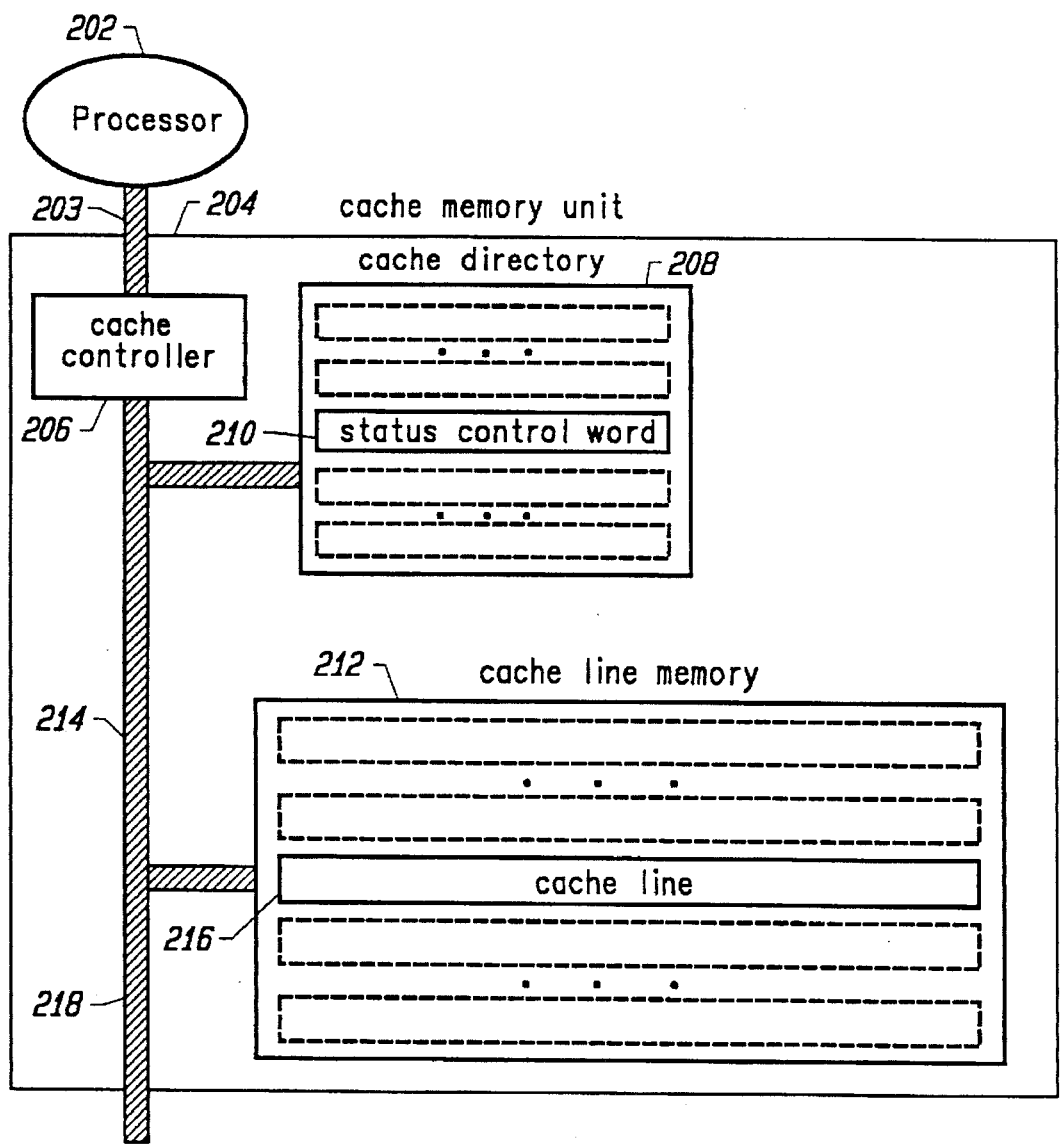
FIG. 2 shows the design of a cache, including the cache controller, cache directory of status control words, cache line memory and interconnecting bus structure.
Figure 4:
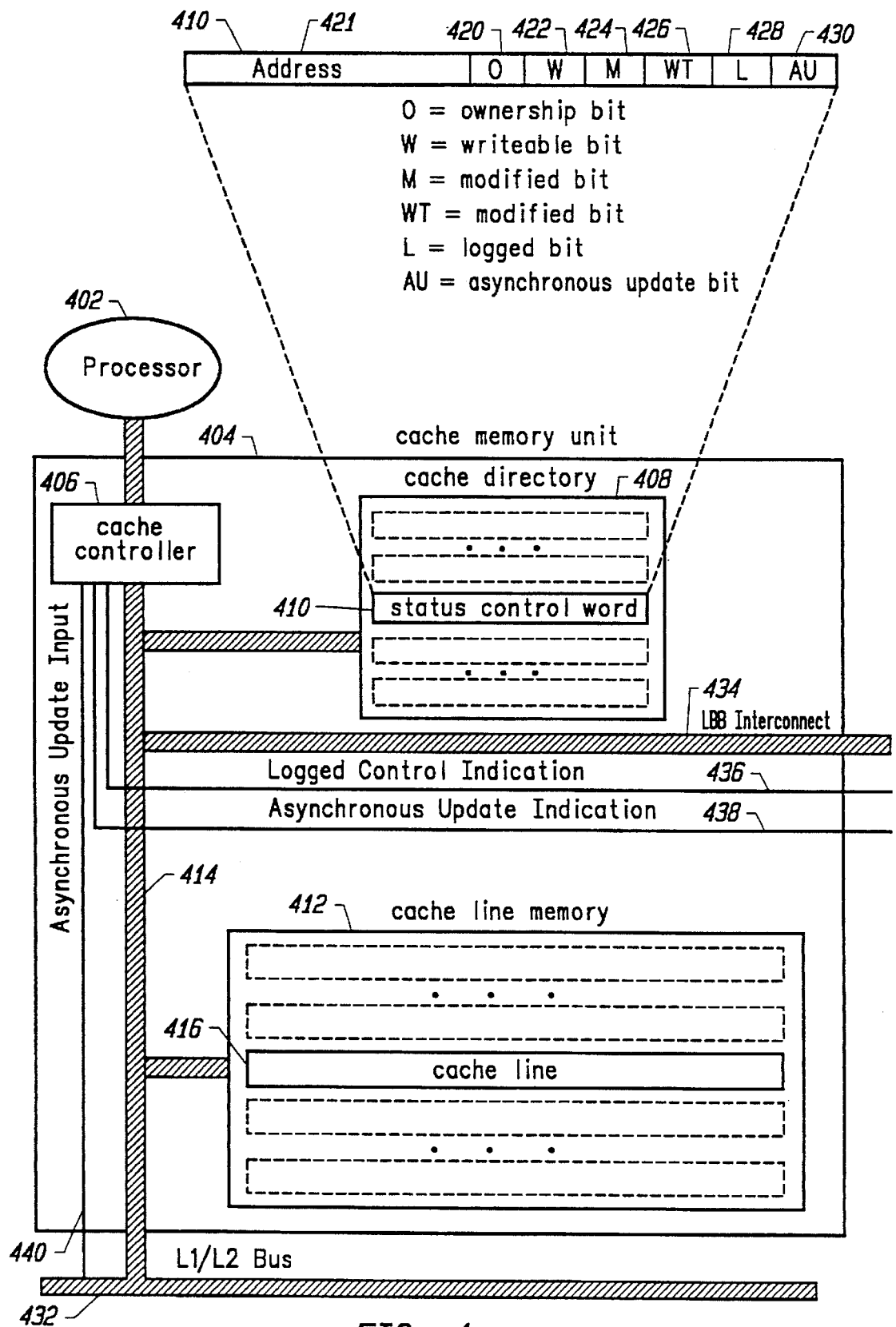
FIG. 4 shows the design of the L1 cache, including the bit fields of a status control word.

FIG. 4 shows a more detailed description of the cache design shown in FIG. 2. An L1 cache 402 contains a cache controller 406, cache directory 408 and cache line memory 412. The cache directory 408 contains a plurality of status control words 410. Each status control word 410 contains the following fields. An address field 421 indicates the address of the memory block associated with the cache line corresponding to the status control word. An 0 ownership control tag 420 indicates whether the associated cache line 416 is owned by this cache. A W writeable control tag 422 indicates whether the associated cache line 416 is writeable by this cache. An M modified control tag 424 indicates whether the associated cache line 416 has been modified by this cache since it was last written back to main memory. A WT write-through control tag 426 indicates whether a write operation to the associated cache line 416 should be written through to the next level of cache or memory, rather than just being retained within this cache line. An L logged control tag 428 indicates whether a write operation to the associated cache line 416 should be logged by setting a logged control indication 436 on a write operation to the cache line. An AU asynchronous update tag 430 indicates whether non-local write operations to the memory block corresponding to the associated cache line 416, as specified by the address bits 421, should cause the cache line to be updated, as indicated by an asynchronous update input line 440. In the case of a write operation by a local processor, the AU bit can be transmitted on the L1/L2 cache bus 432 as a control signal to the other cache controllers 406, if any, using an asynchronous update indication line 438, to signal that this data transfer should be used to update their cache.

Although this description illustrates a separate interconnect for the log block builder and the next level cache, other configurations are feasible within the scope of this invention. As a particular example, the L1 cache controller 406 could perform all L1/L2 bus access through LBB bus interconnect 434.

Figure 5:
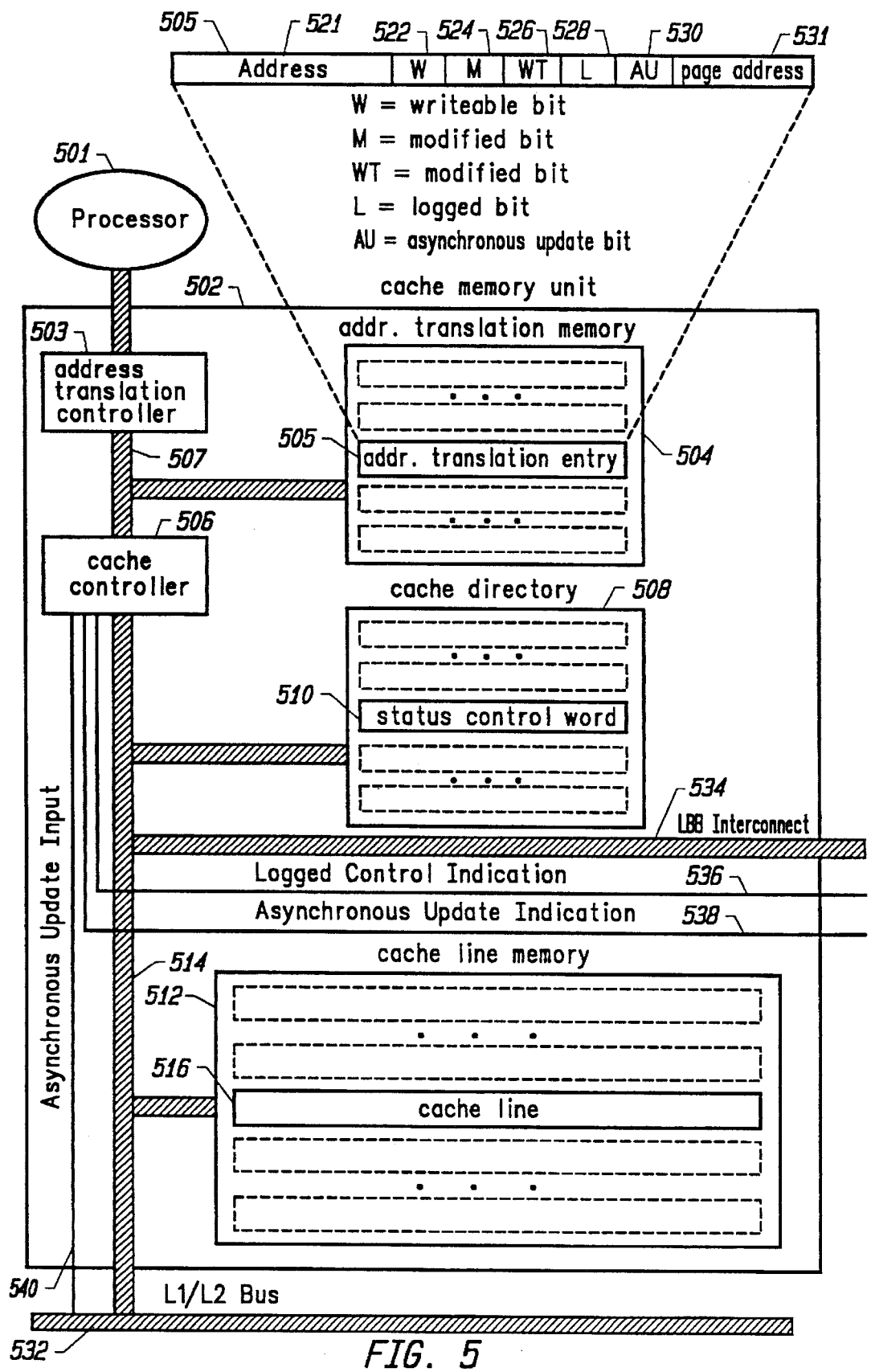
FIG. 5 shows the design of the physically addressed L1 cache with an address translation unit, including the bit fields of a status control word per address translation entry.

As shown in FIG. 5, an L1 cache can also be realized with an address translation unit between the processor and the cache directory and cache line memory, with the WT, L and AU flags stored in the address translation unit, rather than in the cache directory. In this case, the address translation unit maps addresses presented to the cache as part of a memory reference to a translated address that is used to locate the referenced memory location in the cache. The address translation is specified in units of memory pages, which are one or more cache lines in size. An L1 cache 502 contains an address translation controller 503 and memory 504, a cache controller 506, cache directory 508 and cache line memory 512. The address translation memory contains a plurality of address translation entries 505. Each address translation entry 505 contains the following fields. An address field 521 indicates the address of the memory page associated with the address translation entry. The page address field 531 indicates the translated address associated with the address translation entry 505. The control flags 522 through 530 retain the same meaning as the control flags 420 through 430 in FIG. 4 except that they apply to the entire page of cache lines mapped by the address translation entry 505, rather than a single associated cache line 516. In particular, a W writeable control tag 522 indicates whether the one or more cache lines 516 associated with the page address 531 are writeable in this cache. An M modified control tag 524 indicates whether the one or more cache lines 516 associated with the page address 531 has been modified by this cache since it was last written back to main memory. A WT write-through control tag 526 indicates whether a write operation to a cache line 516 associated with the page address 531 should be written through to the next level of cache or memory, rather than just being retained within the cache line. An L logged control tag 528 indicates whether a write operation to a cache line 516 associated with the page address 531 should be logged by setting a logged control indication 536 on a write operation to the cache line. An AU asynchronous update tag 530 indicates whether a non-local write operation to the memory block corresponding to a cache line 516 associated with page address 531 should cause cache line 516 to be updated, as indicated by an asynchronous update input line 538. In the case of a write operation by a local processor, the AU bit can be transmitted on the L1/L2 cache bus 532 as a control signal to the other cache controllers 506, if any, using an asynchronous update indication line 538, to signal that this data transfer should be used to update their cache.

The WT, L and AU flags are particularly novel to this invention. These cache tags are set on cache line load from either similar tags in the L2 cache or a main memory directory or from tags associated with the virtual memory mapping, which maintains the tags on a per-page basis.

Figure 6A:
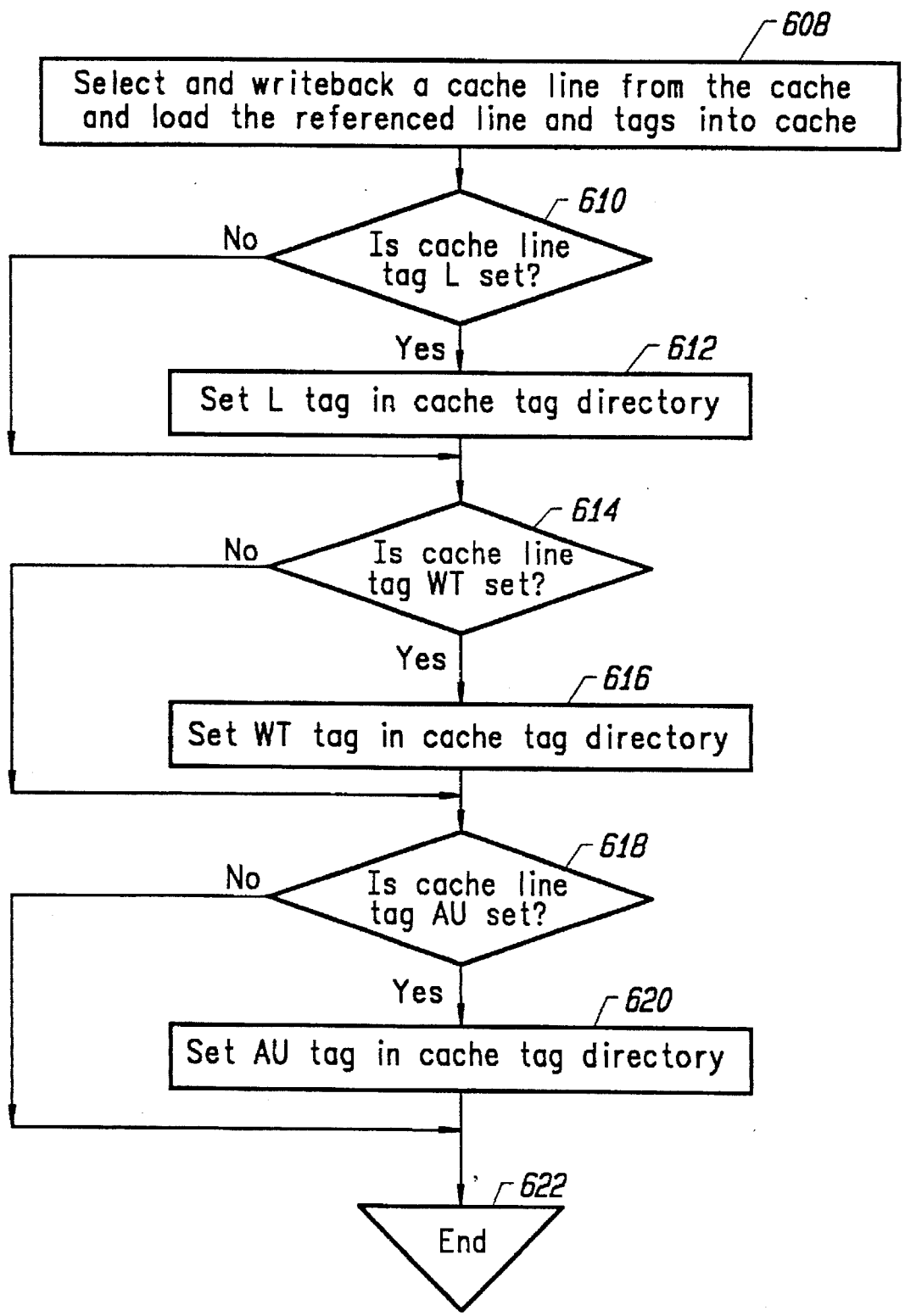
FIGS. 6a and 6b show flow diagrams giving the basic steps for setting the log tag in a memory cache as part of loading the associated the cache line.

The flow diagram in FIG. 6(a) shows the steps for maintaining these flags in a cache memory unit 404. On a cache line load, the cache controller selects and writes back a cache line in block 608 to make space for the new cache line and loads the new referenced cache line and tags into the cache. Decision block 610 tests whether the L tag in the loaded cache tags is set. If so, control flows out of decision block 610 by the path with legend "Yes" to block 612 which sets the L flag in the cache status word corresponding to the loaded cache line. If not, control flows out of decision block 610 by the path with legend "No" to block 614. Decision block 614 tests whether the WT tag in the loaded cache tags is set. If so, control flows out of decision block 614 by the path with legend "Yes" to block 616 which sets the WT flag in the cache status word corresponding to the loaded cache line. If not, control flows out of decision block 614 by the path with legend "No" to block 618. Decision block 618 tests whether the AU tag in the loaded cache tags is set. If so, control flows out of decision block 618 by the path with legend "Yes" to block 620 which sets the AU flag in the cache status word corresponding to the loaded cache line. If not, control flows out of decision block 618 by the path with legend "No" to block 622, which completes the procedure.

Figure 6B:
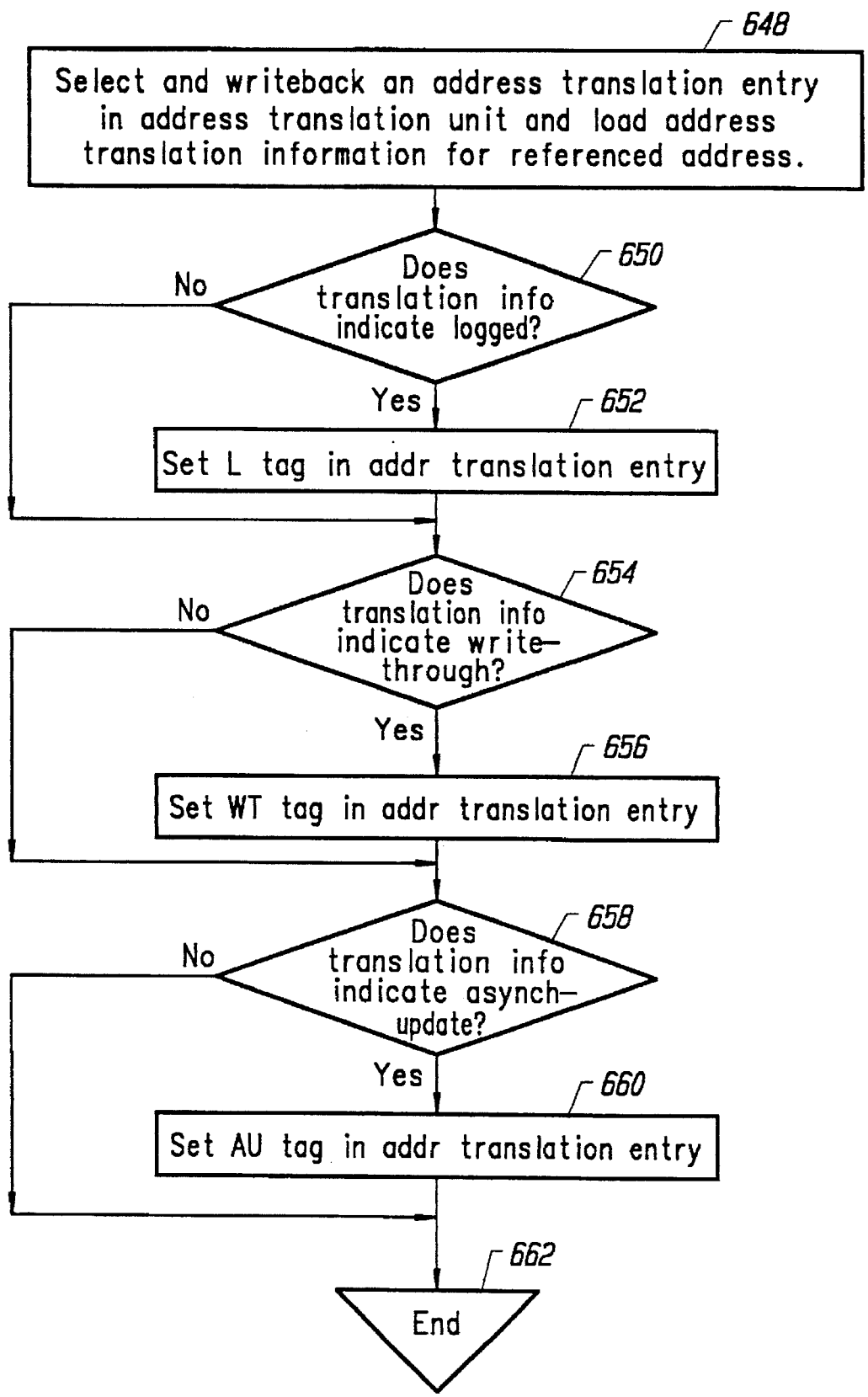

The WT, L and AU flags are an extension of the conventional tags maintained by the cache for each cache line. In the alternative design given in FIG. 5 where a memory reference is proceeded by an address translation step, the WT, L and AU flags may be stored in the address translation tables or caches. The flags may be supplied as control signals to the cache, rather than being stored directly in the cache. The flow diagram in FIG. 6(b) shows the steps for maintaining these flags as part of an address translation memory 504. When an address is presented to the address translation controller 503 and the corresponding address translation entry 505 is not present in the address translation memory 504, the address translation unit selects and writes back an address translation unit in block 648 to make space for the new address translation entry and loads the new address translation entry information. Decision block 650 tests whether the address translation information indicates that the associated page of data is to be logged. If so, control flows out of decision block 650 by the path with legend "Yes" to block 652 which sets the L flag 528 in the new address translation entry 505. If not, control flows out of decision block 650 by the path with legend "No" to block 654. Decision block 654 tests whether the address translation information indicates that the associated page of data is to be written through on write operations. If so, control flows out of decision block 654 by the path with legend "Yes" to block 656 which sets the WT flag 526 in the new address translation entry 505. If not, control flows out of decision block 654 by the path with legend "No" to block 658. Decision block 658 tests whether the address translation information indicates that the associated page of data is to be asynchronously updated. If so, control flows out of decision block 658 by the path with legend "Yes" to block 660 which sets the AU flag 530 in the new address translation entry 505. If not, control flows out of decision block 658 by the path with legend "No" to block 662, which completes the procedure. In operation of the cache design in FIG. 4, a cache line corresponding to a region of memory that is to be logged has both the WT and L tags set. When a write operation occurs for the cache line 416, the address and datum are transferred across the LBB interconnect 434 together with the logged control indication 436. If the L tag 428 is not set, the logged control indication line 436 is not set. If the WT tag 426 is not set, the write operation only updates the L1 cache, marking the affected cache line as modified with the M tag 424, for subsequent copyback, as happens with conventional cache design. The logged tag indicates to the LBB on write-through whether the data is to be logged or not, and takes no other active role at the L1 cache level.

The AU tag 430, when set in the status control word of the cache line receiving a write operation, causes the asynchronous update indication 438 to be set. If the cache line is also marked as write-through, the resulting transfer over the L1/L2 bus 432 is performed with a control indication of asynchronous update, causing the asynchronous update input 440 to be set in caches attached to the L1/L2 bus 432. When the cache controller 406 observes a block transfer over the L1/L2 bus 432 and the asynchronous update input line 440 is also set, the cache controller 406 checks for the presence of a cache line 416 corresponding to the address specified in the transfer and updates this cache line with the transferred data, if this line is present and if the AU tag in the corresponding status control word is set. The operation of the cache design in FIG. 5 is similar.

Figure 7:
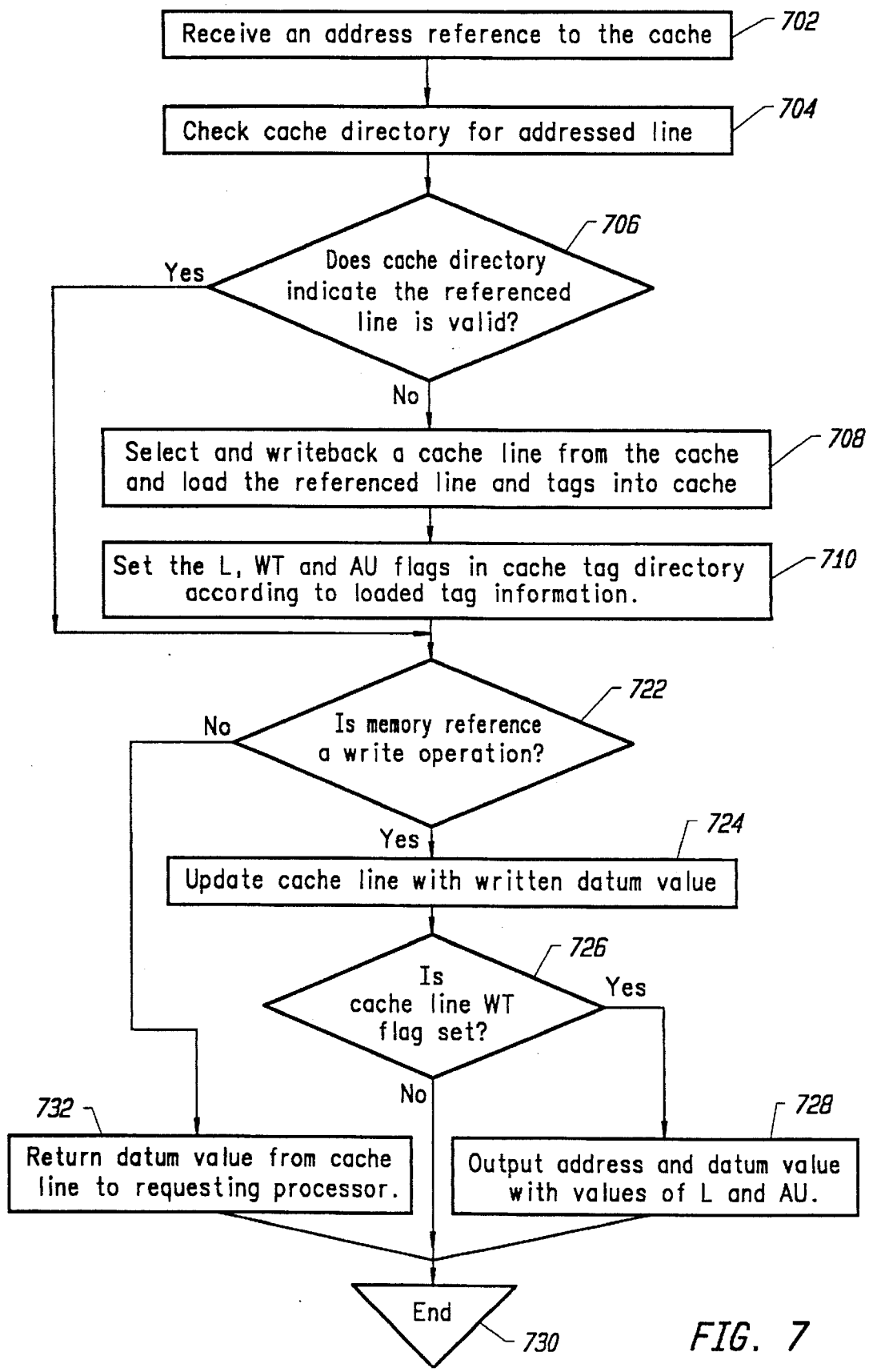
FIG. 7 shows a flow diagram giving the basic steps of a cache controller supporting log-tagged write through in handling a memory reference to the cache.

FIG. 7 shows a flow diagram of the steps performed by the cache controller 406 in response to a memory reference to the cache. Block 702 receives the address designating the memory cell being referenced in the memory access. Block 704 checks the cache directory 408 for a status control word 410 that matches the specified address. Decision block 706 checks whether the cache directory indicates whether the indicated line is present and valid. If so, control flows out of decision block 706 by the path with legend "Yes" to decision block 722. Otherwise, control flows out of decision block 706 by the path with legend "No" to block 708. Block 708 sets the L, WT and AU cache flags in the cache directory corresponding to the steps specified in blocks 608 to 620 in FIG. 6(a). Some details of the conventional handling of cache line writeback and acquiring exclusive ownership of the cache line on write are omitted for the sake of brevity.

Decision block 722 checks whether the memory reference is a write operation. If not a write operation and thus a read operation, control flows from decision block 722 by the path with legend "No" to block 732 which returns the referenced datum's value to the requesting processor or next level cache. If the operation is a write operation, control flows from decision block 722 by the path with legend "Yes" to block 726 which updates the referenced cache line 416 with the datum value being written. Decision block 726 tests whether the WT flag 426 is set for this cache line 416. If so, control flows from decision block 726 by the path with legend "Yes" to block 728, which outputs the address and datum value provided by the write operation over bus interconnect 434 with control lines 436 and 438 set according to the values of the flags L and AU in the cache line, respectively. Control then flows to block 730, ending the procedure. If decision block 726 determines that the WT flag is not set, control flows from decision block 726 by the path with legend "No" to block 730, again ending the procedure.

Although this description provides for 3 separate tags, the number of tags can be reduced by merging the functions of multiple tags into a single one. For example, a single tag can mean that data are written-through, or logged and asynchronously updated, if other combinations described above are not needed. Also, for example, a system can use logging without asynchronous update based on the logging, obviating the need for the AU flag.

Figure 8:
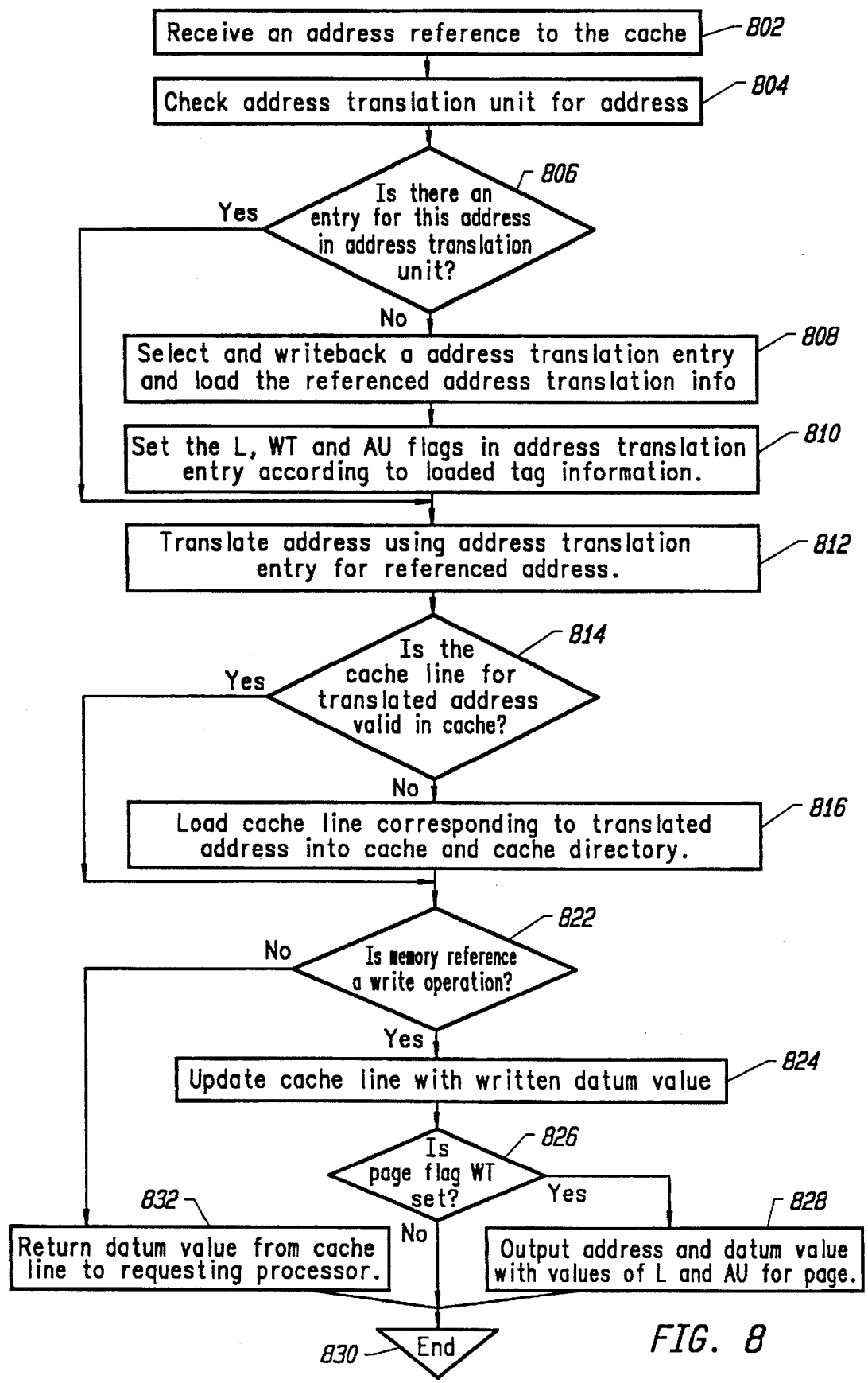
FIG. 8 shows a flow diagram giving the basic steps of a cache controller supporting log-tagged write through in handling a memory reference to the cache with the logging flags stored in the address translation unit.

FIG. 8 shows a flow diagram of the steps performed by the cache controller in response to a memory reference to the cache where the L, WT and AU flags are stored in an address translation memory 504 that translates the reference address prior to accessing the cache, such as is conventionally done with a physically addressed cache. Block 802 receives the address designating the memory cell being referenced in the memory access. Block 804 checks the address translation memory 504 for an address translation entry 505 that matches the specified address. Decision block 806 checks whether the address translation memory indicates whether the indicated entry is present and valid. If so, control flows out of decision block 806 by the path with Legend "Yes" to decision block 812, otherwise, control flows out of decision block 806 by the path with legend "No" to block 808. Block 808 loads the address translation information for the specified address, conventionally coming from main memory data structures (not shown). Block 810 sets address translation entry 505 according to this information, in particular setting the L, WT and AU flags 526, 528 and 530 respectively corresponding to steps specified in blocks 648 to 660 in FIG. 6(b). Block 812 uses the address translation entry 505 to translate the reference address using the page address field 531. Decision block 814 checks whether the cache line corresponding to the translated address is valid in the cache directory 508. If the cache line is valid, control flows from decision block 814 by the path with legend "Yes" to decision block 822. If the cache line is not valid, control flows from decision block 814 by the path with legend "No" to block 816. Block 816 loads the cache line data corresponding to the translated cache into the cache and updates the cache directory with the cache tags information, as in conventional cache designs. Some details of the conventional handling of cache line writeback and acquiring exclusive ownership of the cache line on write are omitted for the sake of clarity.

Decision block 822 checks whether the memory reference is a write operation. If not a write operation and thus a read operation, control flows from decision block 822 by the path with legend "No" to block 832 which returns the referenced datum's value to the requesting processor 501 or requesting next level cache. If the operation is a write operation, control flows from decision block 822 by the path with legend "Yes" to block 826 which updates the referenced cache line with the datum value being written. Decision block 826 tests whether the WT flag 526 is set for the address translation entry 505 associated with this cache line. If so, control flows from decision block 826 by the path with legend "Yes" to block 828, which outputs the address and datum value provided by the write operation over bus interconnect 534 with control lines 536 and 538 set according to the values of the flags L 528 and AU 530 in the address translation entry 505 respectively. Control then flows to block 830, ending the procedure. If decision block 826 determines that the WT flag 526 is not set, control flows from decision block 826 by the path with legend "No" to block 830, again ending the procedure.

In a particular embodiment, a combination of the two approaches of storing the three logging flags can be used. For example, one or more of the three logging flags can be stored in the cache directory as well as the address translation directory, with the address translation directory causing the flags to be set when each cache line is loaded.

If the cache is a physically addressed cache, the address transferred across the LBB interconnect 434 is a physical address. If the L1 cache is virtually addressed, the address may be translated to the corresponding physical address by the L1 cache before transfer across LBB interconnect. Note that the physical address is necessarily stored in the cache directory of a virtually addressed cache to allow writeback (not shown in FIG. 4 for simplicity). Alternatively, with a virtually addressed L1 cache, the address transferred across the LBB interconnect could remain a virtual address, in which case a subsequent point in the memory system, such as the L2 cache 322 in FIG. 3, could translate the virtual address to a physical memory address. In the following subsections, it is assumed that a physical address is passed across LBB interconnect 434 or 534 to simplify the description, and because physically address caches and busses are more common practice. However, a variety of virtually addressed logging schemes can be realized within the scope and spirit of the present invention.

III. Log Block Builder

Figure 9:
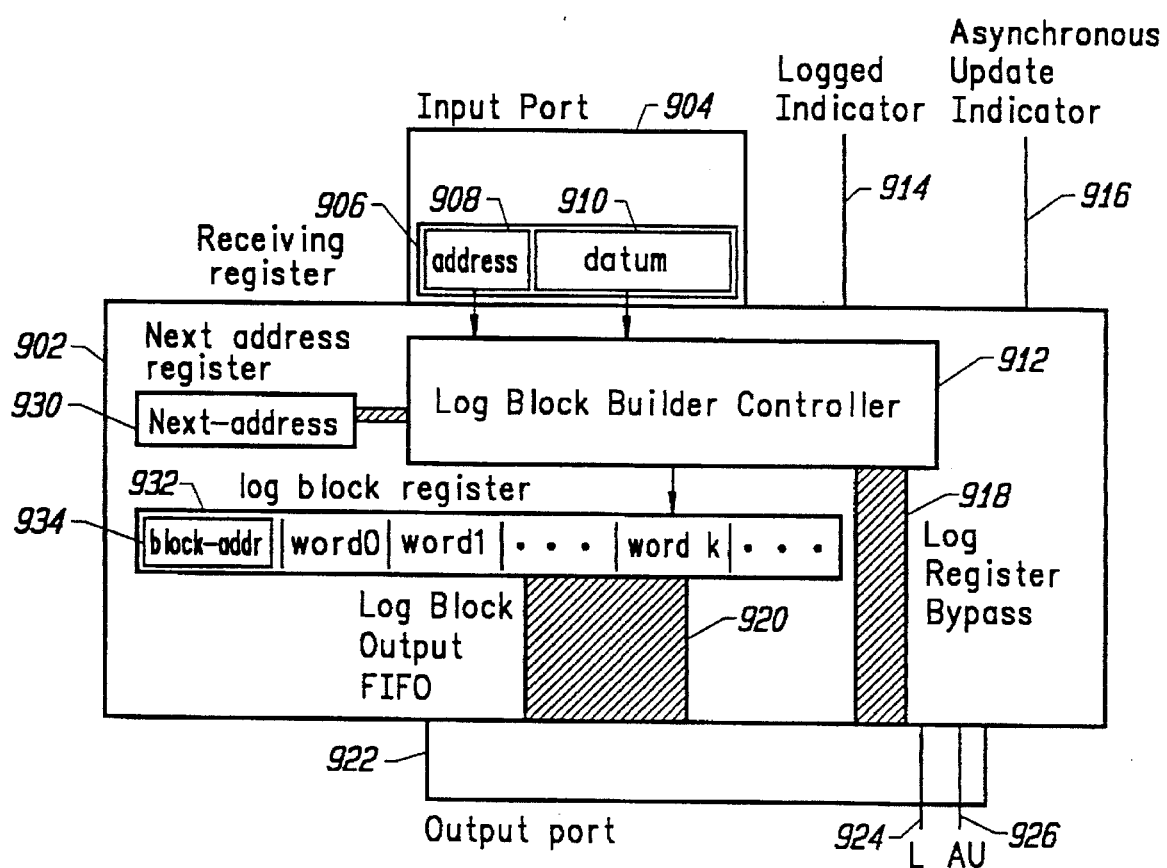
FIG. 9 shows the basic structure of the log block builder.

Referring to FIG. 9, a log block builder (LBB) 902 includes an input port 904 which accepts a next address/datum pair in receiving register 906. The receiving register includes an address field 908, a datum field 910, a logged indicator line 914, and asynchronous update indicator line 916. The address 908 corresponds to the address of a write operation by the processor and cache attached to the input port 904, and the datum 910 is the value written as part of the write operation. Lines 914 and 916 correspond to the states of corresponding tags in the status control word of the cache line written in the L1 cache, as shown in FIG. 4, and described earlier.

The log block builder further includes a log block builder controller 912 attached to a "next-address" register 930 and a current log block register 932, which further includes a block-addr subfield 934, containing the block address for the block contained in the log block register 932. The log block register 932 is further connected to a log block output FIFO 920 which can transfer the contents of the log block register 932 to the output port 922 and output lines 924 and 926. A log register bypass 918 connects the log block builder controller 912 to the output port 922, allowing address, datum, and indicators arriving on the input port 904 to be directly transferred to the output port 922.

Figure 10:
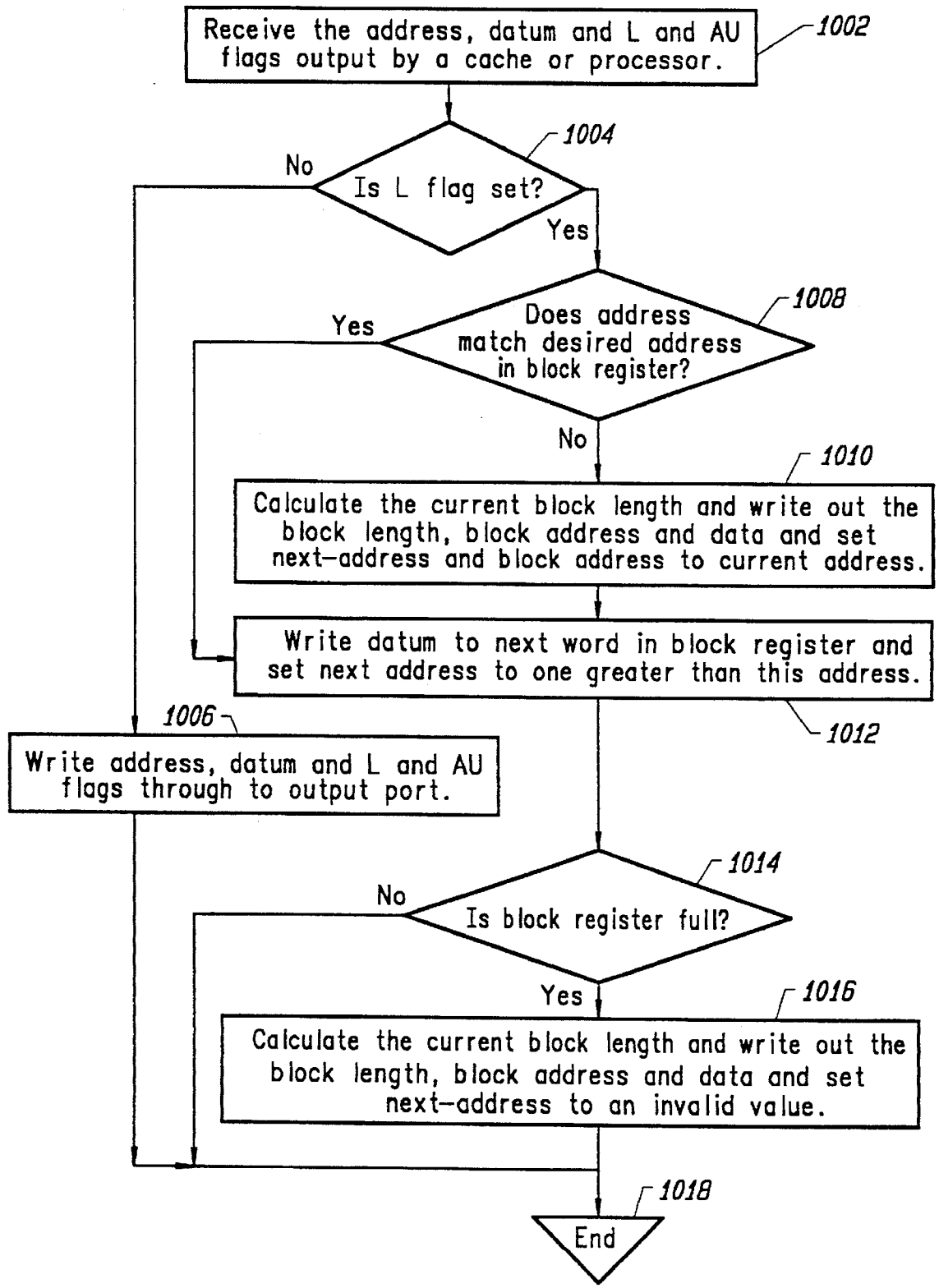
FIG. 10 shows a flow diagram giving the basic steps of a log block builder to build data blocks from write operations.

FIG. 10 shows a flow diagram of the steps performed by the log block builder in response to the address, datum and L and AU indicators arriving on its input port 904 and indicator lines 914 and 916. Block 1002 receives the address, datum and L and AU indicators and stores them in the receiving register 906. Decision block 1004 tests when the L indicator is set. If not, control flows from decision block 1004 by the path with legend "No" to block 1006, which writes the recieved address, datum and L and AU indicators over the log register bypass 918 to output port 922, setting output indicator lines 924 and 926 to match input indicator lines 914 and 916.

If the L indicator is set, control flows from decision block 1004 by the path with legend "Yes" to decision block 1008, which tests whether the block address matches the address in the "next-address" register 930. If not, control flows from decision block 1008 by the path with legend "No" to block 1010, which calculates the current block length using the value in the "next-address" register 930 and outputs the block address, length and data into log block output FIFO 920, which is then transferred to output port 922. The L output indicator 924 is always set to one at this time. The AU output indicator 926 is set according to the setting of the input line 916, as recorded by the log block builder controller 912. Note that, because all data in a log block must originate from one cache line, the setting of control lines 924 and 926 is properly specified by that of the input control lines 914 and 916 for any of the address/datum the above calculates is log block. If the above calculates the length of the block to be zero, the output operation is not performed. Control then flows to block 1012.

Referring back to decision block 1008 if the address does match the value in the "next-address" register 930, control flows from decision block 1008 by the path with legend "Yes" to block 1012, which writes the datum to the next available word in the log block register 932 and sets the "next-address" register 930 to the address following the current datum. For example, on a byte-addressed machine storing a 4-byte word, the "next-address" register 930 would be set to 4 greater than the previous value. Elaborating on writing the datum to the log block register 932, the datum is written to word k of a current log block register 932, where k is the difference between address 908 and a block address 934 field, which indicates the start address of the current log block in register 932.

Control then flows to decision block 1014 which tests whether the log block register 932 is full. If not, control flows from decision block 1014 by the path with legend "No" to block 1018, terminating the procedure. If yes, control flows from decision block 1014 by the path with legend "Yes" to block 1016, which writes out the block length, block address and block data, similarly to that described for block 1010, except that the "next-address" register 930 is set to an invalid address, such as the maximum address, so that subsequent logged write operations start a new log block. Control then flows to block 1018, terminating the procedure.

In a particular embodiment, the processor and the L1 cache only perform full word writes (as is common for so-called RISC processors) so the LBB does not have to deal with byte and half-word (16-bit) writes.

The block length can be output as a separate value or encoded in the block address. In the latter case, the block address can be restricted to occurring on word boundaries, so that the low-order bits of the block are available to encode the length. For example, if the block is restricted to starting on a 4-byte word boundary, the lower 2 bits of the address indicate the number of words in the block, ranging from 1 (01) to 4 (00). Alternatively, and to accommodate larger log blocks, one or more of the highest order bits of the address can be used. In particular, with the address as a 32-bit physical memory address, the high-order bit can be used to increase the maximum number of words per block to 8, while only restricting the amount of physical memory that can be logged to 2 gigabytes. With a 64-byte address, high-order bits can be used for this purpose with no practical restriction on the amount of physical memory that can be logged. This encoding allows the size of the block to appear as part of the address with no increase in size, as is important with the indexed addressed logging mode described below. A variety of other encoding schemes are also possible.

The LBB can be regarded as an extended write buffer, which not only buffers the address/datum pairs generated by write operations, the function of a conventional write buffer, but also compresses the address/datum pairs of multiple consecutive writes into blocks. For simplicity of illustration, FIG. 9 only shows block building for logged data. However, block building can also be applied to non-logged data as well by providing a current block register and next address register as part of the log register bypass 918, or by transferring non-logged data through the log block rebuilding mechanism, but with output control line 924 clear when the transfer out of output port 922 takes place. The LBB can also be extended to handle block transfers coming in its input port 904, as would arise with L1 cache writebacks going through the LBB, and transfer them directly out output port 922.

A log block builder can also be configured with multiple independent log block registers, so that, for example, it can be shared among a plurality of processors, rather than being dedicated to a single processor. The log block builder mechanism can also be incorporated as part of the L1 cache controller, rather than being implemented as a separate module. The output port 922 can be connected to a bus, such as the L1/L2 bus 432 of FIG. 4, giving the other processors and devices on the bus an opportunity to update their local copies of the data, if any, from the log block data. Alternatively, the output port 922 could be connected directly to a log splitter module or another device.

In a particular embodiment, the log block builder can build blocks from a sequence of writes to the same cache block without requiring the references to be in sequential order. In this case, the "next-address" register simply indicates the current cache block, rather than the particular position in the cache block.

Finally, the log block builder is an optimization that combines multiple log write operations into a single operational block, saving on bus transactions and space in the log buffer area. Thus, it is beneficial but not required for the realization of the invention. However, in a particular embodiment, it can be used to reduce bus traffic even without all the other aspects of the invention being present.

Figure 11:
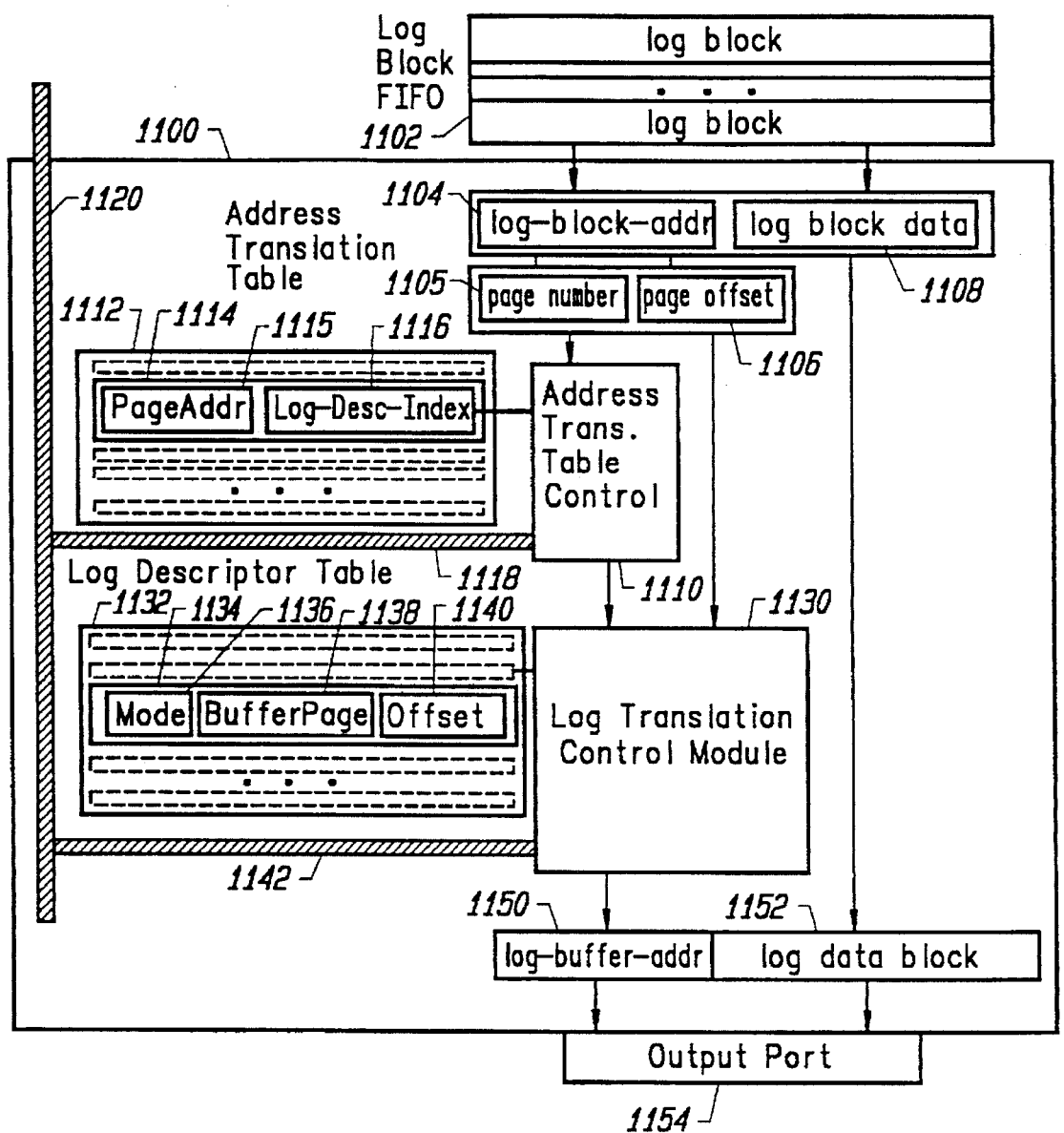
FIG. 11 shows the log splitter structure, which maps an incoming log block address to a log descriptor table entry that then determines the location to which the log block is written and the format or mode in which it is written, including direct, indexed and addressed-index modes.

In a particular embodiment of the present invention, a log splitter is provided as follows. Referring to FIG. 11, a log splitter 1100 includes a log block FIFO 1102 for input, an address translation table control module 1110 that manages an address translation table 1112, a log translation control module 1130 that manages a log descriptor table 1132, a log-buffer-addr register 1150 for forming the log buffer address, a log data block register 1152 for forming the log data block, an output port 1154 for outputting the resulting log buffer address and log data block, and control busses 1120, 1118 and 1142 for signaling to a controlling processor or module and providing access to this controlling processor or module to the address translation table 1112 and log descriptor table 1132. Each log block 1102 comprises a log-block address 1104 and log block data 1108 of one or more words. The log block address 1104 is compromised of a page number 1105 subfield and a page offset 1106 subfield. The page number 1105 is passed to an address translation table control module 1110 which accesses an address translation table 1112, which contains one or more translation entries 1114. Each entry is comprised of a page address 1115 and a log descriptor index 1116. The control module 1110 accesses the table 1112 to locate the entry 1114 that matches the page number 1105 in the page address field 1115. For example, with a 32-bit address and 4096 byte pages, the high-order 20 bits of the log block address 1104 constitute the page number 1105 and the page address field 1115 is 20 bits wide. If no such entry is found, the control module 1110 signals an interrupt on a control bus 1118 and suspends further operation until data is supplied for the table entry over the control bus 1118. When a matching table entry 1114 is available, the control module 1110 extracts the log descriptor index 1116 and passes it to a log translation control module 1130.

The control module 1130 uses this index value to access a log translation table 1132 and select the log translation entry 1134 at that index in the table. A log translation entry 1134 comprises a mode field 1136, a buffer page field 1138 and an offset field 1140. If the entry 1134 is not valid, as indicated by an invalid value for the mode field 1136, an interrupt is signalled on a control bus 1142 and operation is suspended until a valid entry is supplied.

When a valid entry 1134 is available, the control module 1130 forms a log buffer address 1150 and the log data block 1152 from log block address 1104 and data 1108 and the block 1152 is written to an output bus 1154 to the log buffer address 1150.

Figure 12A:
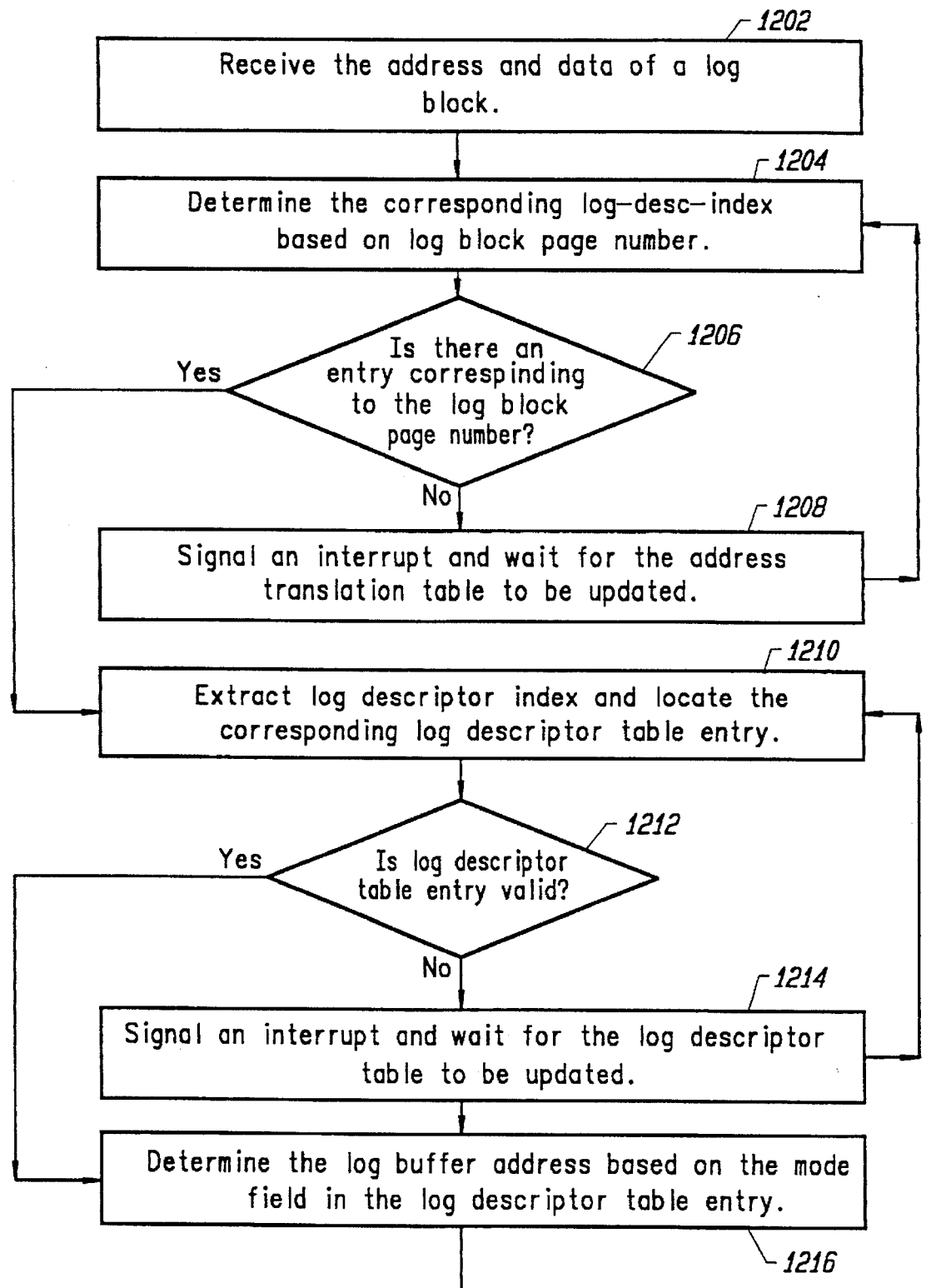
FIGS. 12A and 12B show a flow diagram giving the basic steps of a log splitter to determine the location to which the log block is written and the format or mode in which it is written, including direct, indexed and addressed-index modes.
Figure 12B:
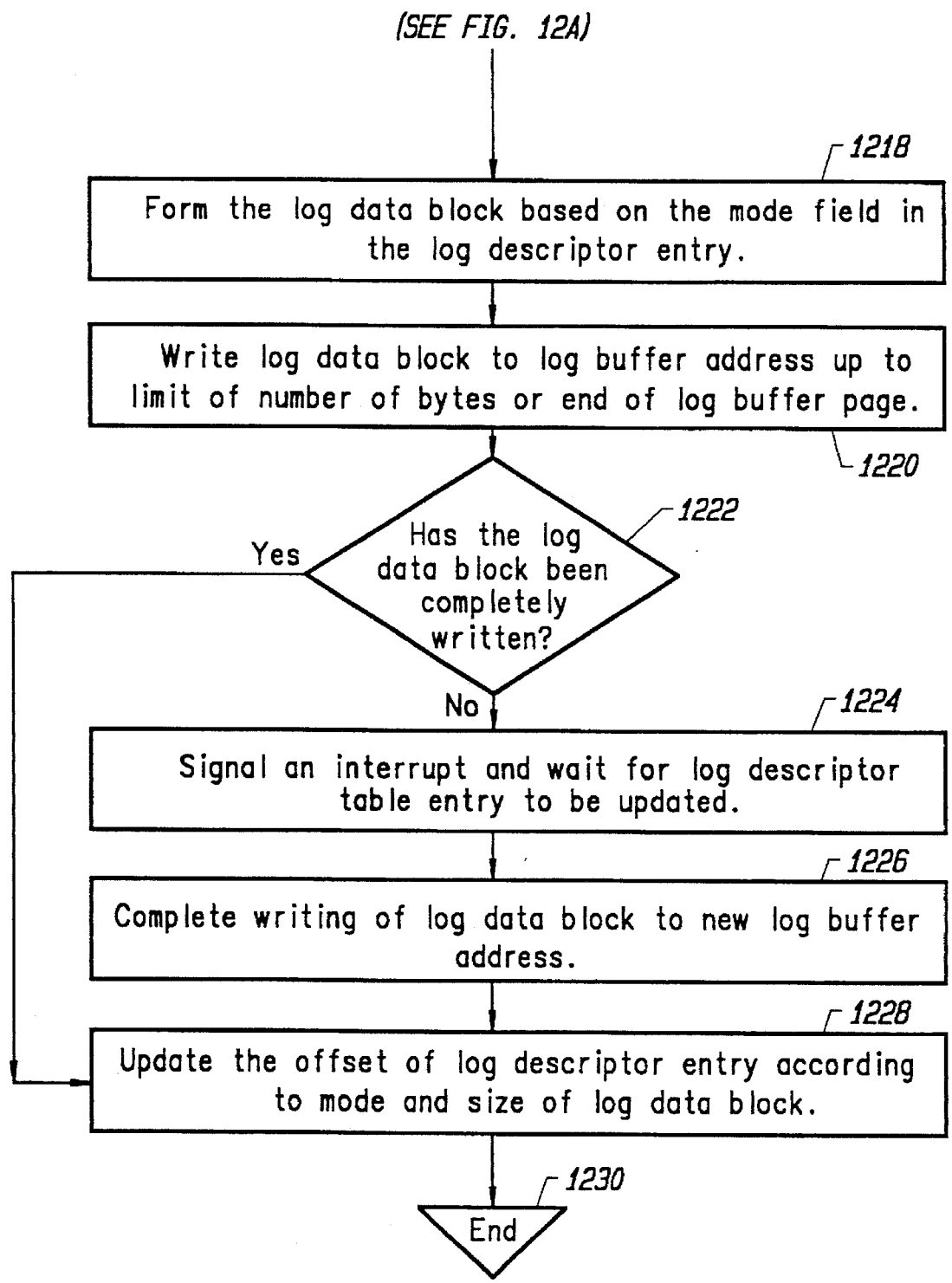

FIGS 12A and 12B show a flow diagram of the operation of the log splitter. Block 1202 receives from log block FIFO 1102, a log block comprising a log-block address 1104 and log block data 1108 of one or more words. Block 1204 determines the translation entry 1114 in address translation table 1112 corresponding to the page number 1105. That is, the page address field 1115 of the entry 1114 matches page number 1105. Decision block 1206 tests whether there is such an entry in the address translation table 1112. If not, control flows from decision block 1204 by the path with legend "No" to block 1208, which signals an interrupt and waits for the address translation table to be updated. The update is normally performed by an operating system procedure that is invoked as a result of the interrupt. However, the action could also be performed by another hardware module or as an extension of the address translation table control 1110, similar to the hardware support for loading of translation lookaside buffers in some conventional computer systems. After the address translation table has been updated, control flows back to block 1204, which effectively retries the operation.

Referring back to decision block 1206, if the entry is located, control flows from decision block 1206 by the path with legend "Yes" to block 1210 which extracts the log descriptor index 1116 and uses it to locate a log descriptor table entry 1134. Decision block 1212 checks whether this entry is valid or not. If not, control flows from decision block 1212 to block 1214 which signals an interrupt and waits for the log descriptor table to be updated. Control then flows to block 1210 which effectively retries the access to the log descriptor table 1132. If the entry is valid, control flows from decision block 1212 to block 1216 which determines the log-buffer-address 1150, based on the mode field 1136 in 1134. Block 1218 forms the log data block 1152 similarly based on the mode field.

In the particular embodiment described here, the mode field is one of three modes: direct, indexed, addressed-indexed. In direct mode, the control module 1130 forms a log buffer address 1150 as the sum of the buffer page 1138 and the page offset 1106. A log data block 1152 is formed directly from the input log block data 1108 and then the block 1152 is written to an output bus 1154 to the log buffer address 1150. In indexed mode and addressed-indexed mode, the control module 1130 forms a log buffer address 1150 as the sum of the buffer page 1138 and the offset 1140. In indexed mode, the log data block 1152 is formed as in the direct mode. In addressed-indexed mode, the log block data 1152 is formed as the log block address 1104 followed by the log block data 1108.

Block 1220 writes the resulting log data block 1152 to the output port up to the minimum of the number of bytes in the log data block 1152 and the bytes between the log-buffer-address 1150 and the end of the buffer page 1138. Decision block 1222 checks whether the log data block was completely written before reaching the end of the buffer page 1138. If not, control flows from decision block 1222 by the path with legend "No" to block 1224 which signals an interrupt and waits for the log descriptor table entry to be updated. Block 1226 then writes the rest of the log data block to the new log buffer address based on the updated buffer page address. Note that a log data block is normally smaller than a page, so a second overflow cannot occur. Block 1228 updates the offset of the log descriptor entry according to the mode and the size of the log data block. In the particular embodiment described here, in indexed mode and addressed-indexed mode, the offset 1140 field of the selected entry 1134 is incremented by the number of bytes of log block data 1108 written to this log buffer page 1138. Control then flows to block 1230, terminating the procedure.

Referring back to decision block 1222, if the log data block was completely written to the original buffer page; control flows from decision block 1222 by the path with legend "Yes" to block 1228 which updates the offset, as described above and then completes in block 1230.

In a particular embodiment, there is a flag for indexing and one for address inclusion supporting the 3 modes described above. The fourth possible mode, which would otherwise be non-indexed addressed mode, can used to indicate an invalid log descriptor table entry.

Multiple address translation table entries 1114 can map to the same log descriptor table entry 1134. This is particularly useful in the case of indexed and addressed-indexed modes, where multiple application data pages need to append to the same log file, and thus need to share the same buffer page and same offset. In a particular embodiment in which this facility is not needed, the address translation table 1112 and the log descriptor table 1132 can be combined into a single table.

In a preferred embodiment, the translation table is a cache of translation entries. When a translation is missing, the log splitter generates an interrupt that is handled by operating system software. The interrupt-handling software locates the required information in software-maintained tables and loads the address translation cache with the corresponding entry, similar to the way conventional translation lookaside buffer (TLB) misses are handled in many current computer systems. It may also need to load a log descriptor table entry for the log buffer associated with this page if it is not already present in the log descriptor table. The log splitter also generates an interrupt when the index for log entry reaches the end of the buffer page, allowing the software to provide a new buffer page before the log writing resumes. The log splitter must be prepared to retain the log data during this software processing, using a FIFO or other buffering mechanism.

The log splitter can be connected to both the L2/L3 bus as well as back to the local L1/L2 bus, as illustrated in FIG. 3.

The log splitter is primarily required to support multiple logs and multiple logging modes. Thus, it can be simplified and possibly eliminated in restricted systems with a single log buffer area and a fixed logging mode. Some portion of the log splitter could also be incorporated in the log block builder. For instance, the address translation table 1112 could be incorporated into the log block builder, with the log descriptor index 1116 then being used to route the log block to the correct (reduced function) log splitter, containing only the functions associated with the log descriptor table 1132.

IV. Log Copy Cache

A log copy cache is a cache with an address mapping mechanism that is extended to include two addresses, rather than one, namely a source address and a destination address, logically for each cache entry. These two addresses are determined by a source/destination mapping stored in the virtual memory system, such as extended page tables. In particular, this mapping can be established using a copy-on-write mechanism available in some operating systems.

Figure 13A:
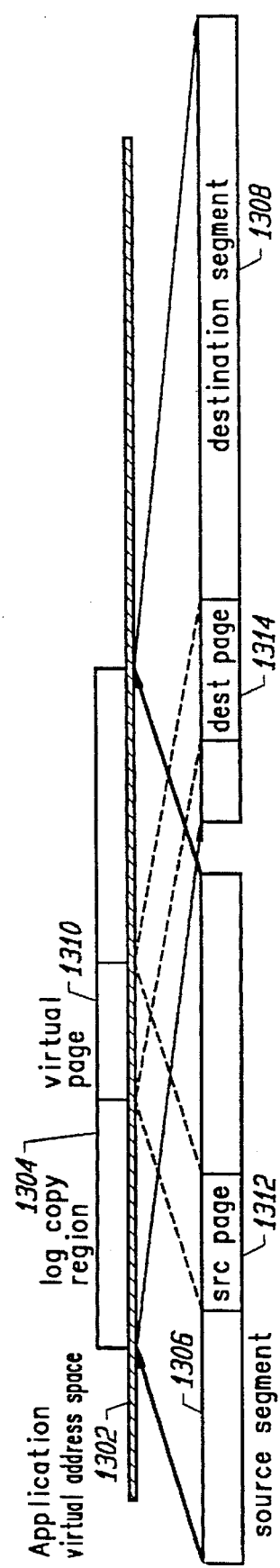
FIGS. 13A and 13B show the copy-on-write mapping and two forms of extensions to cache address mapping for log copying.

The basic log copy cache operation is as follows. Referring to FIG. 13A, in an application virtual address space 1302 for a given virtual memory region 1304, a copy-on-write mapping is established by an operating system call using a source segment 1306 and destination segment 1308 such that there is associated with each virtual page 1310 in the virtual memory region, a source page 1312 and a destination page 1314. A read operation by the processor from an address in the virtual page 1310 brings in the cache line data at the corresponding offset in the source segment page 1312. In this situation, the virtual page 1310 is referred to being sourced by the segment page 1312. A write operation simply marks the cache line as modified, as arises with conventional cache behavior. If consistency or replacement actions cause such a modified cache line to be written back to memory, it is written back to the corresponding offset in the destination page 1314, thereby affecting the copy. This behavior is referred to as a cache-based log copy because the cache is used to effect the copy, and only those portions of the segment that are actually modified (at the granularity of a cache line) are actually copied or logged to the destination segment. There is no processor copy operation involved, unlike conventional copy-on write operations. Thus, the cache lines that are updated in the destination segment represent a log of changes to the segment (once the cache is flushed of these modified lines).

Figure 13B:
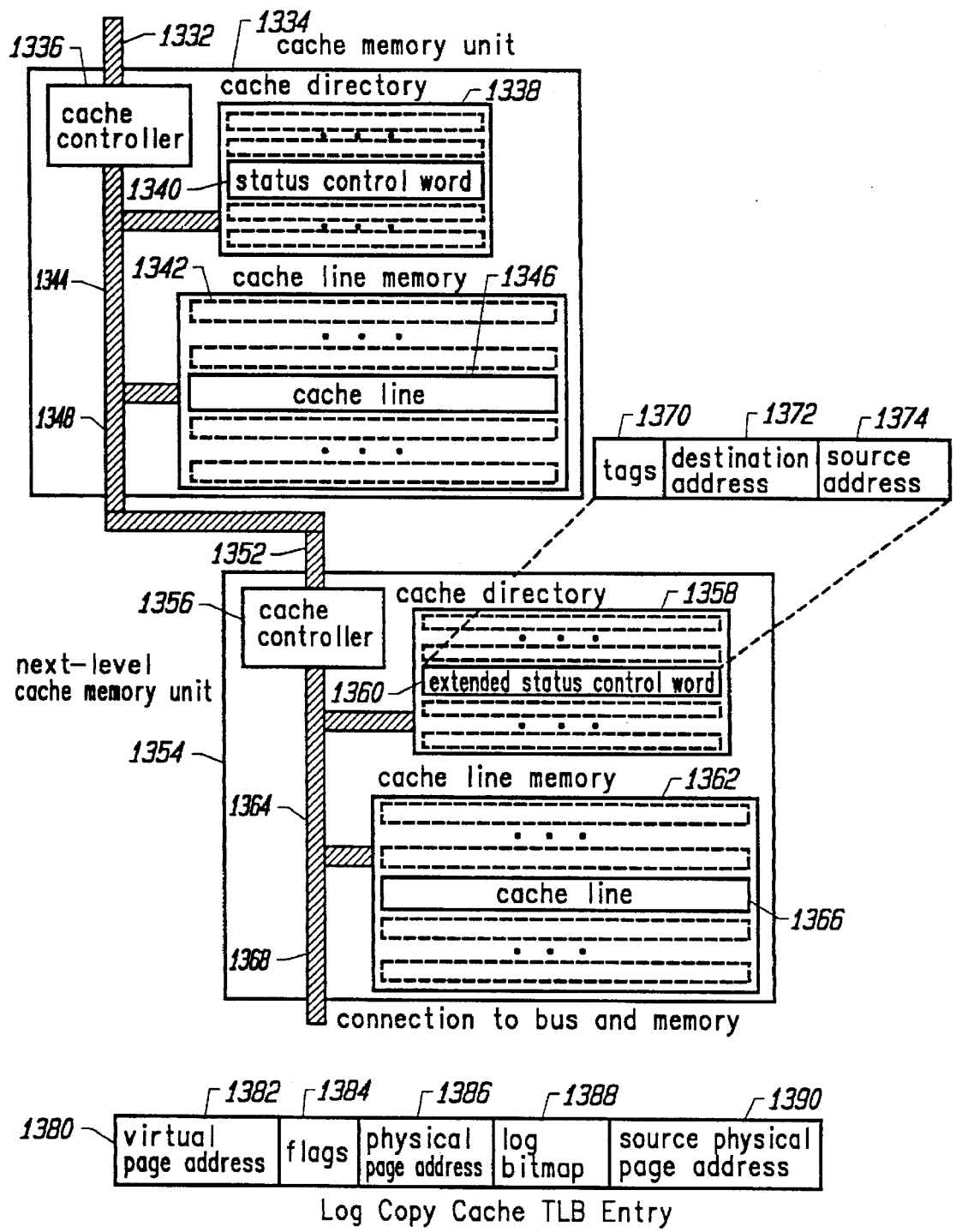

Referring to FIG. 13B, log copy can be implemented by extending the next-level cache or memory to include a source physical address 1374 for each (extended) status control word 1360. In FIG. 13B, the cache memory unit 1334 matches the cache memory unit 204 described in FIG. 2, and so is not described again. Similarly, the next-level cache 1354 is similarly the same as cache memory unit 204 except for the addition of the source physical page address 1374 to the (extended) status control word 1360.

Figure 14:
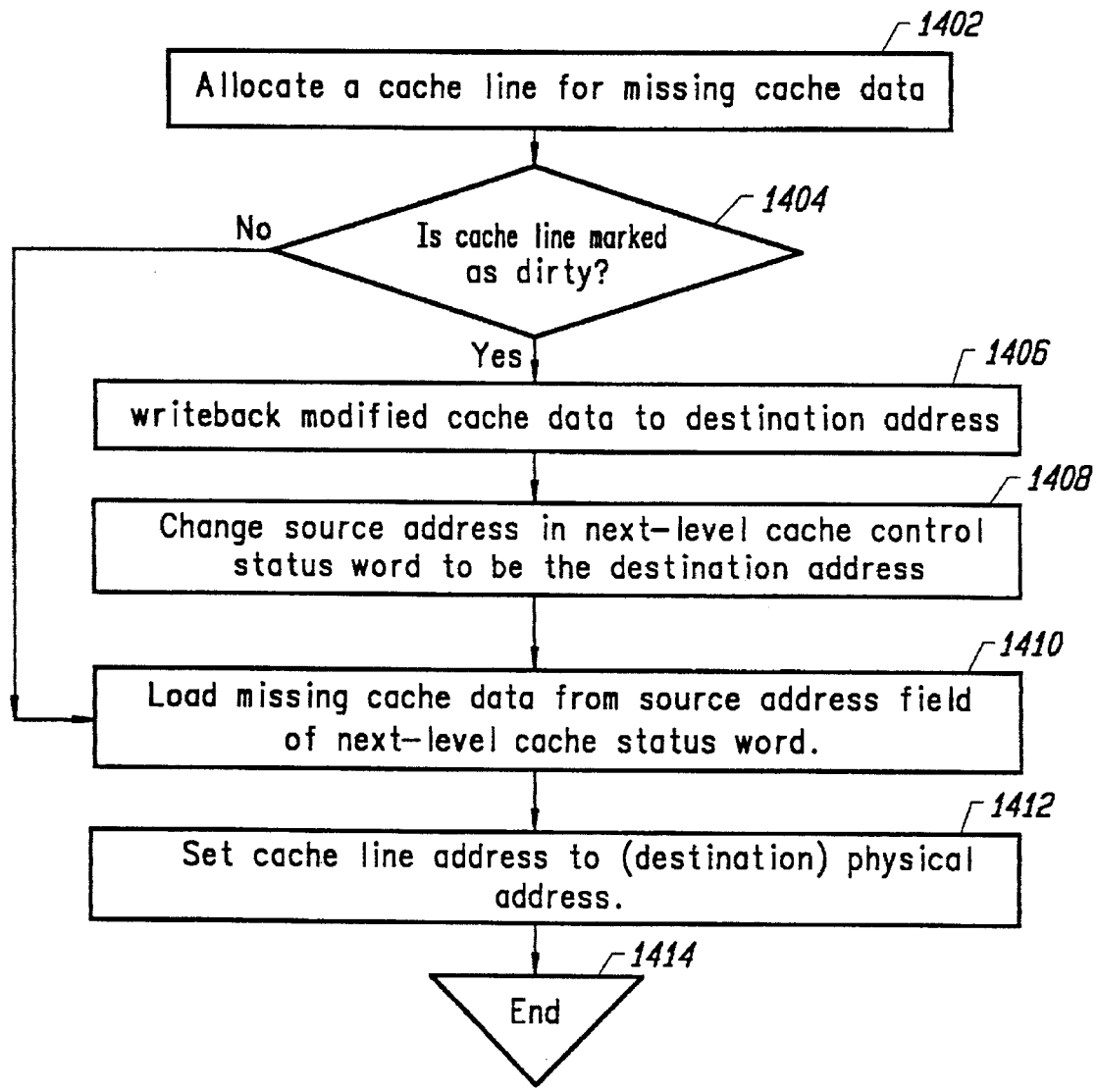
FIG. 14 shows a flow diagram giving the basic steps of performing log copying as part of the cache load and writeback mechanism using an extended next-level cache addressing mechanism.

Referring to FIG. 14, log copying using this mechanism works as follows. On reference to an address contained in a cache data not present in the cache 1334, block 1402 allocates a cache line 1346. Decision block 1404 tests whether the cache line is marked as dirty. That is, its contents have been modified since the last time it was written back to the next-level cache 1354. If the cache line is dirty, control flows out of decision block 1404 by the path with legend "Yes" to block 1406 which writes back the modified cache line data to the cache line 1366 corresponding to the address in the next-level cache or memory associated with this cache line 1346, as recorded in status control word 1340. Block 1408 then changes the source address field 1374 to the same as the destination address field 1372, so that subsequent accesses to this cache data by its address retrieve this just stored data in cache line 1366. Block 1410 then loads the missing cache data from the source address 1374 contained in the status control word 1360 corresponding to the address used to generate the cache miss. Block 1412 sets the address field of the status control word 1340 to this address (not shown) as well as setting other relevant tag fields of the status control word 1340, as is standard with contentional cache miss handling. Block 1414 then completes the cache miss handling, allowing the memory access operation, read or write, to complete in the normal fashion.

The next-level cache memory unit 1354 can be a memory with a directory, as is required for directory-based cache consistency or an additional level of memory cache between the processors and the memory system. When a page is mapped by the operating system, the source address field 1374 is set according to the operating system mapping of the page for each cache line 1360 contained in the page being mapped. That is, if the page is mapped with a copy-on-write mapping as in FIG. 13A, each extended status control word 1360 is set to contains the address of the cache line in source page 1312 corresponding to the cache line in the destination page 1314. In the absence of a copy mapping, the source address 1374 is set equal to the address 1372, so the cache data is then read from the same location to which it is written, as is normal. For consistency purposes, the cache line data is identified by its destination address 1372 so invalidations or updates are properly reflected in all caches.

In a particular embodiment, the destination address can be either a physical or a virtual address. Normally, the source address is a physical address if the next-level cache or memory unit is physically addressed; it is a virtual address if this next level is virtually addressed.

The operating system data structures record the existence of the log copy region 1304 using a descriptor for each region including information indicating the portions of the region that are sourced by the source segment 1306. Initially, the entire region is sourced by the source segment 1306. As write operations are performed on memory locations in the region 1304, the log copy is performed in the cache, as described above. When a modified cache line 1366 contained in a destination page 1314 is removed from the next level cache, the page descriptor for the destination page 1314 is updated to indicate that cache line of the page is no longer sourced from the source page 1306. In a particular embodiment, each destination segment 1308 is restricted to participating as the destination in at most one log copy region 1304 at one time.

As an alternative embodiment, in FIG. 13B, each address translation entry 1180 in the address translation mechanism, such as the translation lookaside buffer (TLB) or page tables, is extended with a log bitmap 1388 and a source physical page address 1390, besides the normal fields of virtual address 1382, flags 1384 and physical (destination) page address 1386. On reference to the cache, the address translation mechanism supplies both a source address as well as the conventional destination address. The data is looked up in the cache based on the destination address. If not found, the cache line is loaded from the source address but recorded in the cache at the destination address.

Figure 15:
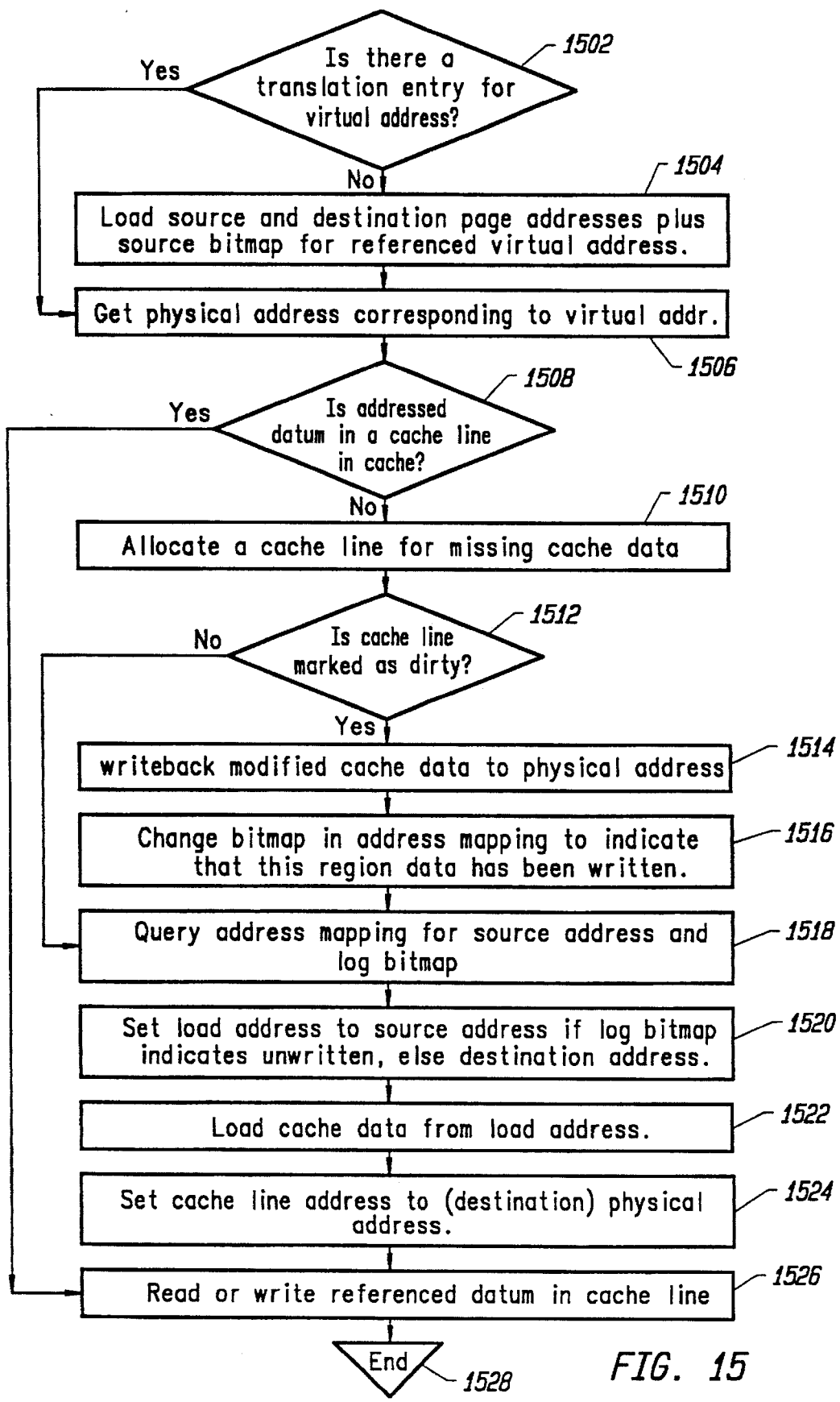
FIG. 15 shows a flow diagram giving the basic steps of performing log copying as part of the cache load and writeback mechanism using an extended address translation mechanism.

More specifically, referring to FIG. 15, on reference to the cache using a particular virtual address, decision block 1502 tests whether there is a translation entry 1380 corresponding to the virtual address. If there is no such entry, control flows from decision block 1502 by the path with legend "No" to block 1504 which loads the virtual page 1382, flags 1384, physical page 1386, the log bitmap 1388 and source physical page 1390 from page tables or similar operating system data structures. (If the previous entry value has been modified, such as by modifications to the log bitmap 1388, the values are first written back to the corresponding locations in the operating system data structures. This follows the conventional handling of the dirty bit in TLB entries and similar.) Block 1506 then determines the physical address corresponding to the referenced virtual address, using this entry. Referring back to block 1502, if there is a translation entry for the virtual address, control flows from decision block 1502 by the path with legend "Yes" to block 1506, determining the physical address as above.

Decision block 1508 checks whether the datum addressed by the physical address is contained in a cache line in the cache. If it is not, control flows from decision block 1508 by the path with legend "No" to block 1510, which allocates a cache line for the missing cache data. Decision block 1512 then tests whether the allocated cache line is marked as dirty. If yes, control flows from decision block 1512 by the path with legend "Yes" to block 1514 which writes back the modified or dirty cache data to the physical address associated with the cache line. Block 1516 then changes the bitmap in the address mapping for this written back cache line to indicate that the data has been written. Block 1518 queries the address mapping for the log bitmap 1388 and the source physical page address 1390. (Referring back to decision block 1512, control flows directly to block 1518 if the cache line is not marked as dirty.) Continuing from block 1518, block 1520 sets the load address to the corresponding address in the source physical page 1390 if the corresponding bit in the log bitmap 1388 indicates that cache data has not been written, otherwise setting the load address to the corresponding address in the (destination) physical page 1386. Block 1522 loads the cache data from the load address into the allocated cache line. Block 1524 sets the physical address in the cache status control word 1340 to the physical address corresponding to the cache line in the destination page, independent of whether it was loaded from the source or the destination page. Block 1526 performs the requested memory access on the loaded cache line, either reading and returning the referenced datum or writing the referenced datum and marking it as modified. Block 1528 then ends the procedure. Referring back to decision block 1508, if the addressed datum is in the cache, control flows directly to block 1526 which handles the memory access as described above and then terminates the procedure in block 1528.

In a particular embodiment, the log bitmap 1388 is sized to contain a bit for each cache line contained in a page. For example, with 4 kilobyte pages and 128-byte cache lines, the bitmap would require 32 bits. With normal mapping of memory, either the log bitmap could be set to indicate all loads use the normal physical address or the source physical page 1390 could be set equal to the physical page address 1386, so conventional memory access behavior would result. The log bitmap can be viewed as an extension of the conventional modified or dirty bit maintained in conventional address translation mechanisms. In this vein, the state of this bitmap could be updated on write operations to the corresponding page, rather than at the point of writeback, as was described in FIG. 15. It is written back to page tables or other operating systems data structures, the same as the conventional page dirty bit. In systems with multiple caches, such as a cache-based multiprocessor, the log bitmap must be kept consistent across all processors along with the other address translation information. This can be accomplished by invalidating other copies of the bitmap or by broadcasting the update to the bitmap to the other copies on each modification. The normal cache consistency mechanism precludes two caches from modifying the same cache line, and thus the same entry in the log bitmap, at the same time.

This alternative mechanism requires approximately two additional words per page, namely one for the source address and one for the log bitmap, rather than an extra word per cache line, as required by the first embodiment.

With the extension of source physical page addresses and the log bitmap, the need for a separate write protection mechanism in the address translation mechanism, as is conventionally provided, could be replaced as follows. When a page is write-protected, the source physical address contains the actual physical address of the page and the physical address field is set to an invalid address, and the log bitmap is set so that all read references are handled through the source physical address. Thus, read operations complete normally and write operations cause a reference to an invalid page, causing a fault, which is handled by the operating system, as is conventional for page protection violations. This technique allows some simplification of conventional page translation mechanisms, partly compensating for the additional complexity and address translation space required to handle log copy support.

In the preferred embodiment of log copy, a reset operation is also supported. The reset operation resets the mapping of the log copy region 1304 to its initial state, prior to any write operations. That is, all read operations of a particular address following such a reset return the corresponding datum in the source segment 1306 until a subsequent write operation to that particular address or an address in the same cache line. Thus, a reset effectively undoes the log copy, discarding all updates performed prior to the reset.

Figure 16:
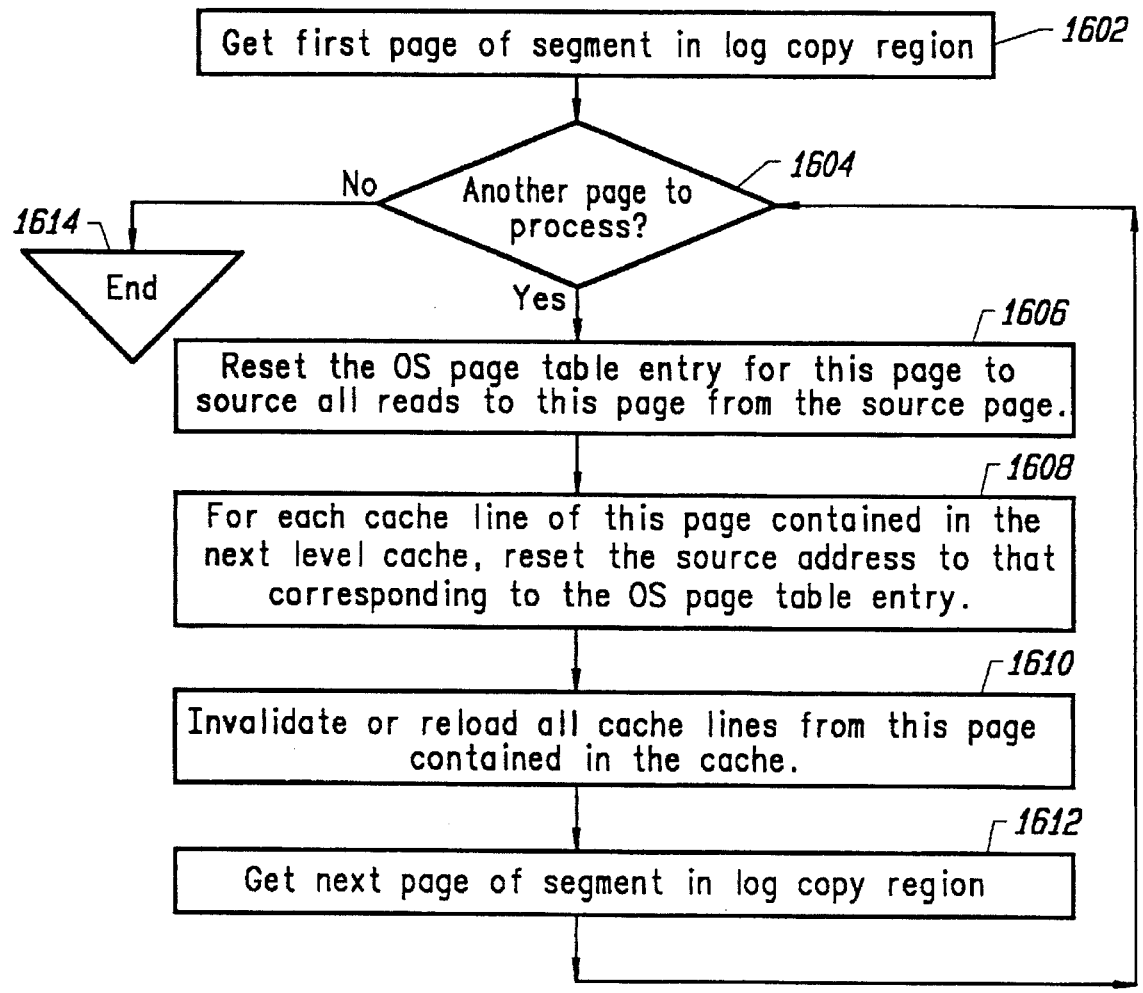
FIG. 16 shows a flow diagram giving the basic steps of performing a log copy reset using an extended next-level cache addressing mechanism.

FIG. 16 shows a flow diagram of the log copy reset method for a cache with log copy support in the next level cache, as was illustrated in FIG. 13B. When a reset of a log copy region is requested, block 1602 locates the first page of the destination segment 1308 contained in the log copy region 1304. Decision block 1604 tests whether there is another page, or a first such page on the first execution, to process. If there is not, control flows from decision block 1604 by the path with legend "No" to block 1614, terminating the procedure. If there is such a page, control flows from decision block 1604 by the path with legend "Yes" to block 1606 which resets the entry for this page in the operating system data structures so that reads are sourced to the source page 1312 corresponding to this (destination) page 1314. For example, the operating system may maintain a bitmap indicating the pages in the log copy region 1304 which are sourced by a page in the source segment 1306. Block 1608 resets the source physical address 1374 of each cache line 1368 in the next-level cache 1354 that is contained in the destination page 1314 to the address of the corresponding cache line in the source page 1312. For example, with 128-byte cache lines and the cache line 1368 being the third cache line in the destination page 1314 according to its physical address 1372, the corresponding source physical address 1374 is equal to the physical address of the source page 1312 plus 256 bytes. Block 1610 invalidates each cache line in the cache 1336 contained in the destination page 1314. Block 1612 gets the next page of the segment contained in the log copy region 1304, at which point control returns to decision block 1604, repeating the above procedure if there is another page or else terminating in block 1614.

Figure 17:
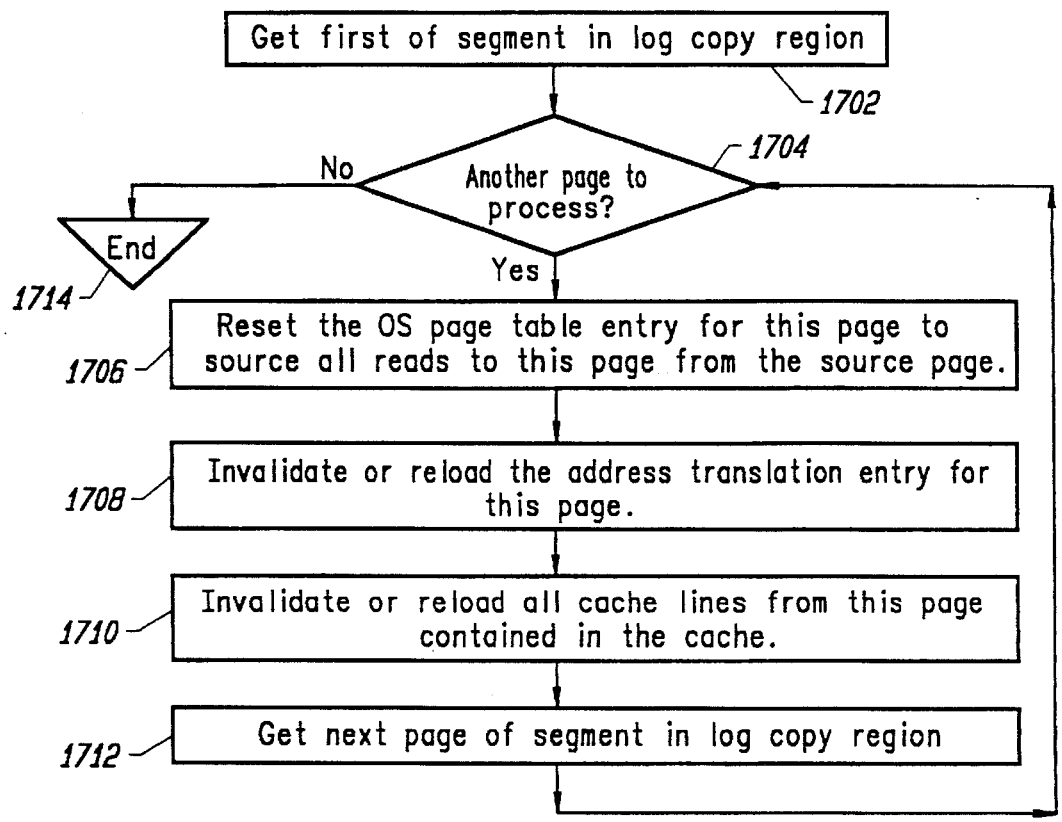
FIG. 17 shows a flow diagram giving the basic steps of performing log copy reset using an extended address translation mechanism.

FIG. 17 shows a flow diagram for a log copy reset in a log copy cache using an extended address translation mechanism. The procedure repeats the steps of FIG. 16 except for block 1708 so only block 1708 is described, for the sake of brevity. Block 1708 invalidates or reloads the address translation entry 1380 for the destination page 1314, resetting the log bitmap 1388 and the source physical page address 1390 to match the operating system data structures, thereby causing the destination page 1314 to be sourced from the source page 1312.

V. Software Embodiment of Logging

Various portions of the invention can be realized in software in place of the hardware realization described above.

Log write updates can be generated by explicitly including in the code executed by the application, a test around each application write operation to determine whether the write operation should be logged and, if so, code to write the value and possibly the address to a log handling facility. This software mechanism would eliminate the need for the cache log tags and the associated logic to produce log write through to the log block builder.

The log handling facility can also be implemented in software by code that maps the logged address and datum to a log descriptor, determines the logging mode and log buffer area from this log descriptor and then writes the datum and optionally the address to the log buffer address determined from this log descriptor following the method described for the log splitter hardware implementation. Thus this code effectively implements the log splitter in software. The log block builder may be effectively realized in software by including code in the log handling mechanism that checks whether the last datum written to the log directly precedes by address the current datum and the log block containing it is not the maximum length allowed. If these conditions are match, the code appends the datum to this log block and updates the length count. Otherwise, it starts a new log block.

This software mechanism can be simplified further if the full generality of the invention is not required. For example, if there is a single log per application, the mapping to a log descriptor based on address can be eliminated. Similarly, if log block building or different log modes are not required, the associated mechanisms can be eliminated.

Log copying can similarly be implemented in software by either explicitly testing for writes to areas that need to perform a copy on write, or else by using the virtual memory address translation mechanism to trap write operations. The latter either only performs the log copy on a page basis, yielding the conventional implementation, or else needs to trap on every write access to a page in copy-on-write mode.

Portions of this software realization could be implemented in hardware using one or more of the logging hardware components described above. For example, the hardware could provide a special register, a special area of memory or a special set of processor instructions that transfer the log data and address to a hardware log block builder and log splitter of the invention, with the actual transfer of the logged datum and address still performed by explicit code included in the application software. Similarly, for log copying, some of the cache management functions could be implemented in software, with the hardware providing control on a cache-line granularity and extended address translation mechanism or extended cache status control words. In general, the present invention can be embodied in a combination of hardware and software without departing from the overall spirit and scope of the invention.

VI. Log-Based Rollback Recovery

Figure 18:
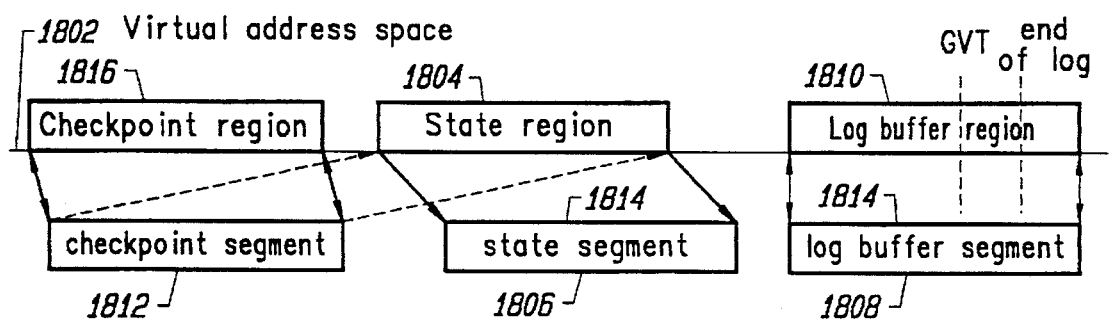
FIG. 18 shows memory mapping and logging structure for fine-grain log-based rollback of state.

The log mechanism can be used in conjunction with the log cache for highly efficient rollback and recovery. In overview of operation illustrated in FIG. 18, a process maintains, as part of its virtual address space 1802, its active state in a state region 1804, which is backed by a state segment 1806. The state region 1804 is mapped as logged to a log buffer segment 1808, which is mapped into the application virtual address space 1802 as a log buffer region 1810. A checkpoint segment 1812 is mapped as a log copy to the current state region 1804. That is, it is mapped copy-on-write over the state region 1804 such that read operations to the state region 1804 return the value contained at the corresponding location in the checkpoint segment 1812 unless that location has been written since the last checkpoint reset (described below). Otherwise, a read operation returns the last value written to that location, which is stored in the state segment 1806. A write operation to the state region 1804 is stored in the state segment 1806 and does not directly change the data in the checkpoint segment 1812. Thus, writes to the state region incrementally update the state segment 1806 relative to the checkpoint segment. Because the current state region 1804 is logged, each such write operation is also stored in the log buffer segment 1808. Thus, each write to the state region 1804 follows the path 1814.

Figure 19:
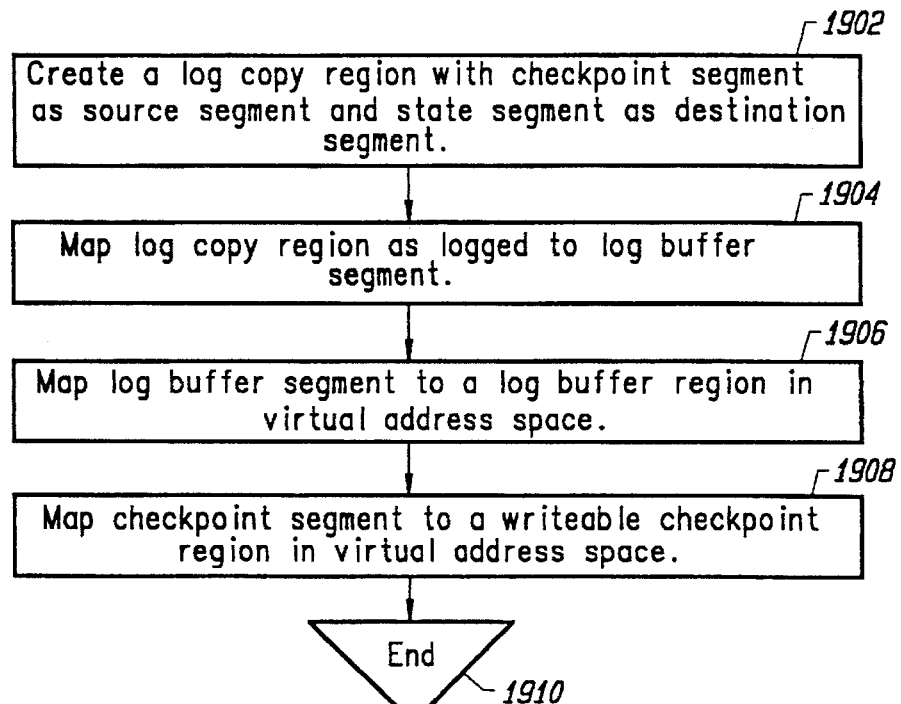
FIG. 19 shows a flow diagram giving the basic steps for mapping segments so as to allow fine-grain log-based rollback and recovery.

FIG. 19 shows a flow diagram of the method for setting up a region of memory for fine-grain log-based checkpointing and rollback. Block 1902 creates a log copy region 1804 using a checkpoint segment 1812 for the source segment and a state segment 1806 for the destination segment. In a particular embodiment, each segment is a disk file which has been opened, and the log copy region 1804 is created by mapping a portion of each file into the virtual address using an operating system call similar to an extended version of the Unix mmap system call. The checkpoint segment 1812 may be a copy of the program's initialized data segment when the program first starts execution. That is, the checkpoint segment contains the initial data state of the program when it first starts execution. Block 1904 modifies the mapping of the log copy region 1804 to log updates to a log buffer segment 1808. In a particular embodiment, this action is performed by providing an optional parameter to the operating system call that performs the mapping. Alternatively, it could be performed as a separate operating system call that modifies the mapping created in block 1902, similar to the separate modification of a mapping supported by the Unix mprotect system call, but affecting the logging state of the mapping, not the protection state. Block 1906 maps the log buffer segment 1808 to a log buffer region 1810, allowing the log segment to be read from the application address space. In a particular embodiment, this action is performed by an operating system call similar to the Unix mmap which maps an (open) file into a region of the virtual address space. Block 1908 maps the checkpoint segment 1812 to a checkpoint region 1816. In a particular embodiment, this action is again performed by an operating system call similar to the Unix mmap system call. The checkpoint region 1816 is mapped to allow write access to the checkpoint segment 1812, as is required for checkpoint update.

Figure 20:
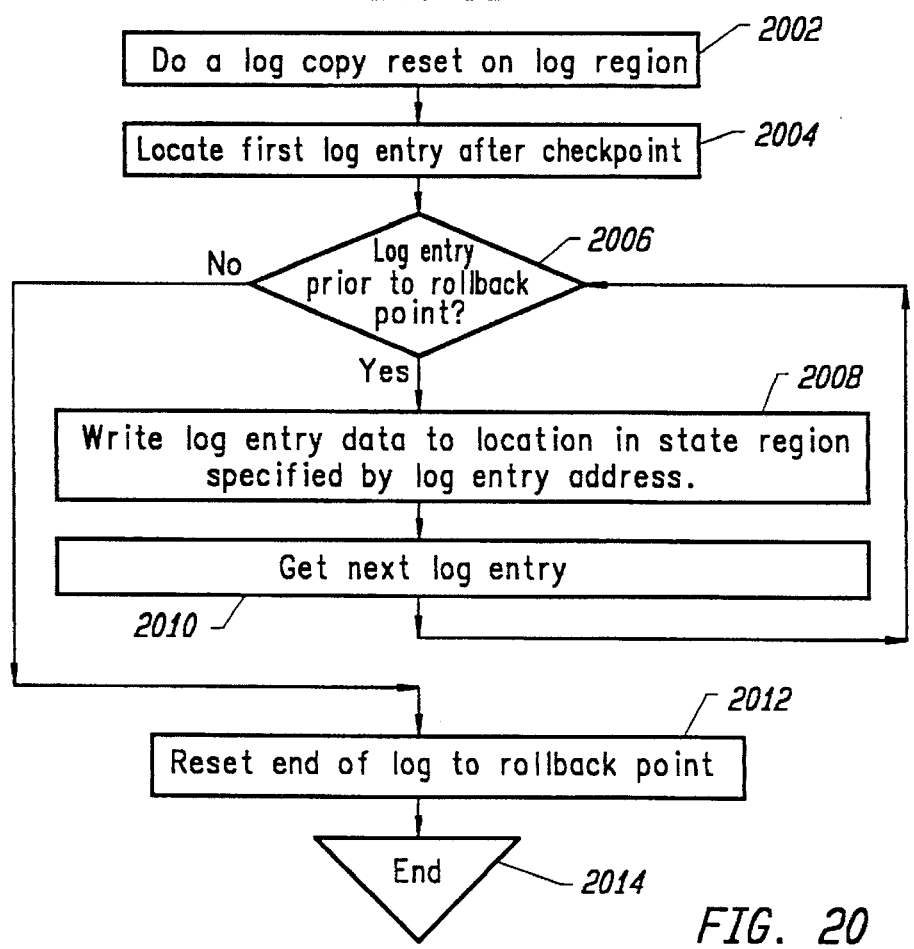
FIG. 20 shows a flow diagram giving the basic steps of performing a fine-grain log-based rollback.

With the above setup of a region of memory for fine-grain log-based rollback and checkpointing, a process can effectively rollback its current state to a specified rollback point in the execution between the point in execution represented by the checkpoint segment 1812 and the current execution point, using the method described by the flow diagram in FIG. 20. Block 2002 does a log copy reset (as described in Section 5.4), exploiting the fact that the state region 1814 is mapped as a log copy region 1304. This log copy reset is referred to in this context as a checkpoint reset. The effect of a checkpoint reset is to discard all changes to the current state segment made since the previous checkpoint reset. Block 2004 locates the first log entry in the log buffer segment 1808 that was made after the point in execution represented by the checkpoint segment 1812. In a particular embodiment, this location is remembered as a simple variable recording the address in the log buffer region 1810 corresponding to this log entry. Decision block 2006 tests whether this log entry was added to the log prior to the specified rollback point. If no, control flows from decision block 2006 by the path with legend "No" to block 2012 which resets the end of the log to the rollback point by setting the end of the log. The end of the log is the point that the log splitter will subsequently place new log entries in the log buffer segment 1808. In a particular embodiment, a system call is provided to change the logging state in the operating system data structures and logging hardware to specify this new end point.

Referring back to decision block 2006, if the log entry was added prior to the specified rollback point, control flows from decision block 2006 by the path with legend "Yes" to block 2008 which writes the data associated with the log entry to the address in the state region 1804 corresponding to the address stored in the log entry. In a particular embodiment, the logging is set up in address-indexed mode so that the location of the datum update as well as the datum is available for each entry in the log. If the addresses stored in the log are physical addresses, the process has to translate each address back to a virtual address to determine the current location in the current state segment 1804 to apply the update. Block 2010 gets the next log entry and control then flows back to decision block 2006. Thus, after performing a checkpoint reset, the process effectively rolls forward the current state region 804 by applying updates recorded in the log buffer segment 1808 (accessed through the log buffer region 1810) between the last checkpoint update (described below) and the new end of the log, which corresponds to the desired rollback point in execution.

In some applications, the process may truncate the log to eliminate the remaining updates to the end of the log. For example, in an optimistic parallel simulation, the process may need to effectively rollback to a virtual time t1 which is earlier than the current virtual time t2, but later than the virtual time corresponding to the last checkpoint update, t0. In this circumstance, the process rolls back to virtual time t0 by performing a checkpoint reset and then applies updates from the log buffer segment 1808 to the state region 1804 up to the point in the log corresponding to virtual time t1 and truncates the log beyond this point by resetting the offset in the log descriptor used by the log splitter to point to the next location after that corresponding to virtual time t1. In other cases, the application may retain these entries in the log for such reasons as subsequent processing and analysis, and thus omit or modify block 2012 of the rollback method.

In a particular embodiment, the application of the log entries to the state region, as in block 2008, causes each such write to be logged to the log buffer segment 1808, further extending the end of the log. These extra log updates are effectively discarded in block 2012 when the end of the log is reset to the specified rollback point. Alternatively, logging can be disabled during the execution of the rollback procedure or logging can be directed to separate log buffer segment.

Figure 21:
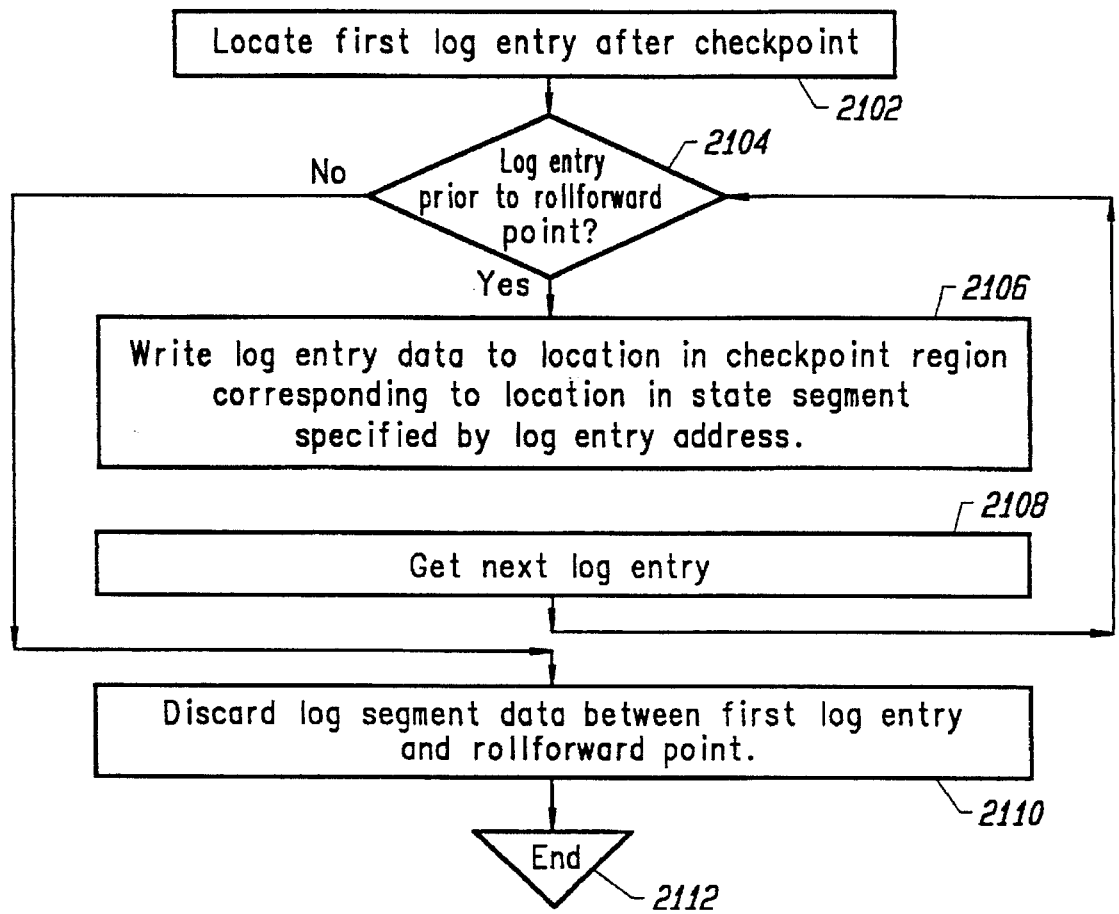
FIG. 21 shows a flow diagram giving the basic steps of performing a log-based fine-grain checkpoint update.

A log-based checkpoint update to a specified rollforward point is performed by the method described in FIG. 21. Block 2102 locates the first log entry after the checkpoint. In a particular embodiment, this entry is the first entry in the log buffer segment 1810 because the log buffer segment is truncated to the first log entry not applied to the checkpoint segment 1812 during each checkpoint update. Decision block 2104 checks whether this log entry is prior to the rollforward point, the point to which the checkpoint segment 1812 is to be updated. If the log entry is prior to the rollforward point, control flows from decision block 2104 by the path with legend "Yes" to block 2106 which writes the log entry data to the location in the checkpoint region 1816 corresponding to the location in the state region 1804. In a particular embodiment, the checkpoint segment 1812 and the state segment 1806 are fully mapped into the virtual address space 1802 so there is an address in the virtual address space 1802 corresponding to each location in each segment. The location in the checkpoint region 1816 to write log entry data is thus computed by first computing its offset within the state segment 1806 from the address stored in the log entry, and then storing the data at the corresponding offset in the checkpoint region 1816. This translation may require translating from physical address, if so stored in the log, to virtual address, corresponding to a location in the state region 1804. The calculation of the corresponding location can be further adapted using standard techniques if the state region 1804 or the checkpoint region 1816 are not contiguously mapped into the virtual address space 1802.

Block 2108 locates the next log entry and control flows back to decision block 2104. The next log entry is calculated by adding the size of the current log entry to the address of the current log entry. If the log entry is not prior to the rollforward point, control flows from decision block 2104 by the path with legend "No" to block 2110 which discards the log segment data from the first log entry up to, but not including, the rollforward point in the log, namely this last log entry examined. In a particular embodiment, this log data is moved from the log buffer segment 1808 to a disk file to save on memory space, the log buffer segment 1808 is extended to the right in FIG. 18 to accommodate further log writing to the log segment 1808, and the log region 1810 is revised to map the revised log buffer segment 1808 into the virtual address space 1802. Block 2112 terminates the procedure.

A log-based checkpoint update allows the process to incrementally update the checkpoint segment 1812 to reduce the cost of rolling forward and reduce the size of the log segment 1808 (because portions of the log now incorporated in the checkpoint segment state can be discarded, or at least written back to secondary storage). For example, in an optimistic parallel simulation, the process may periodically update the checkpoint to Global Virtual Time (GVT) by applying updates from the log buffer segment 1810 up to the point corresponding to GVT in the log. (GVT is the earliest virtual time back to which a process need ever rollback.) With this mechanism, the process only rolls back to its state at GVT, reducing the cost of rolling forward to the required rollback time, especially when that time is close to GVT. In a particular embodiment, there is also a total checkpoint update which copies the modified cache lines of the state region 1804 to the checkpoint region 1816, thereby making the checkpoint segment 1812 consistent with the state segment 1806. This total update is equivalent to a checkpoint update with the rollforward point being the end of the log, but may be more efficient in some cases.

Multiple state segments, log buffer segments and checkpoint segments and the corresponding mapped regions can be provided by repeating the above techniques for each instance.

VII. Device Output

Figure 22:
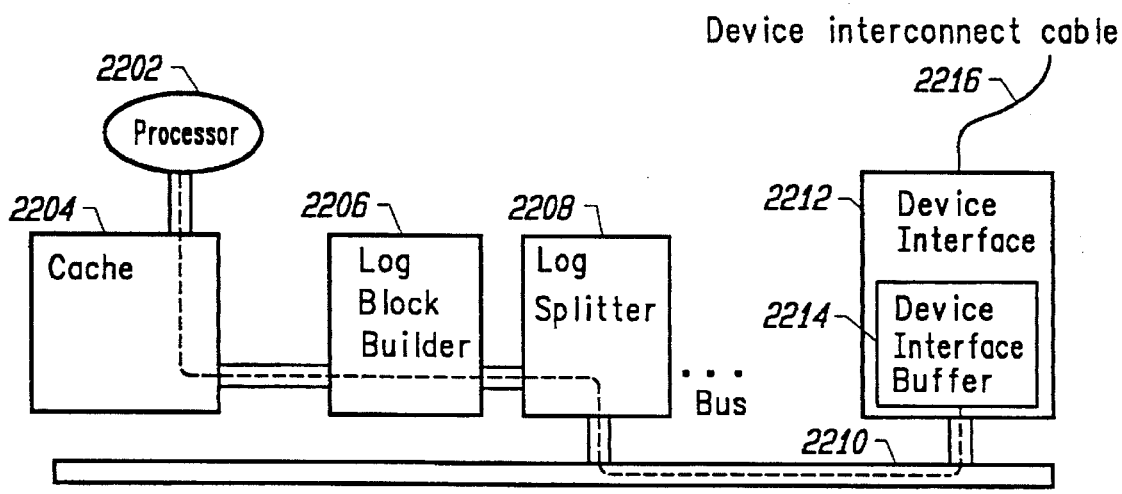
FIG. 22 shows the transfer of data for device output using the logging support, illustrating a processor generating data that is written into logged memory, which is then (re)built into blocks and mapped and transferred to a region of memory (the "log buffer") in a device interface to effect transfer of data to the device.

The present invention supports high-performance device output as follows. Referring to FIG. 22, a processor 2202 is attached to a cache 2204 with logging support, as above. The cache 2204 is attached to a log block builder 2206 which is attached to a log splitter 2208 which is attached to a bus 2210, such as the L1/L2 bus 432 of FIG. 4. A device interface 2212 has a device interface buffer 2214 which is attached to the bus 2210.

For simplicity, the log splitter 2208 is shown as directly connected to the log block builder 2206 rather than being connected through a cache, such as its connection to the L2 cache 322 in FIG. 3. In the latter interconnection scheme, the device output data would transfer once over the L1/L2 bus to reach the log splitter and possibly again with a mapped address to reach the device interface. As an alternative embodiment, if the log splitter mapping is not required for mapping the output, the log block builder can be connected directly to the bus which is connected to the output device. A variety of other interconnection configurations are possible without departing from the scope and spirit of the present invention.

Figure 23:
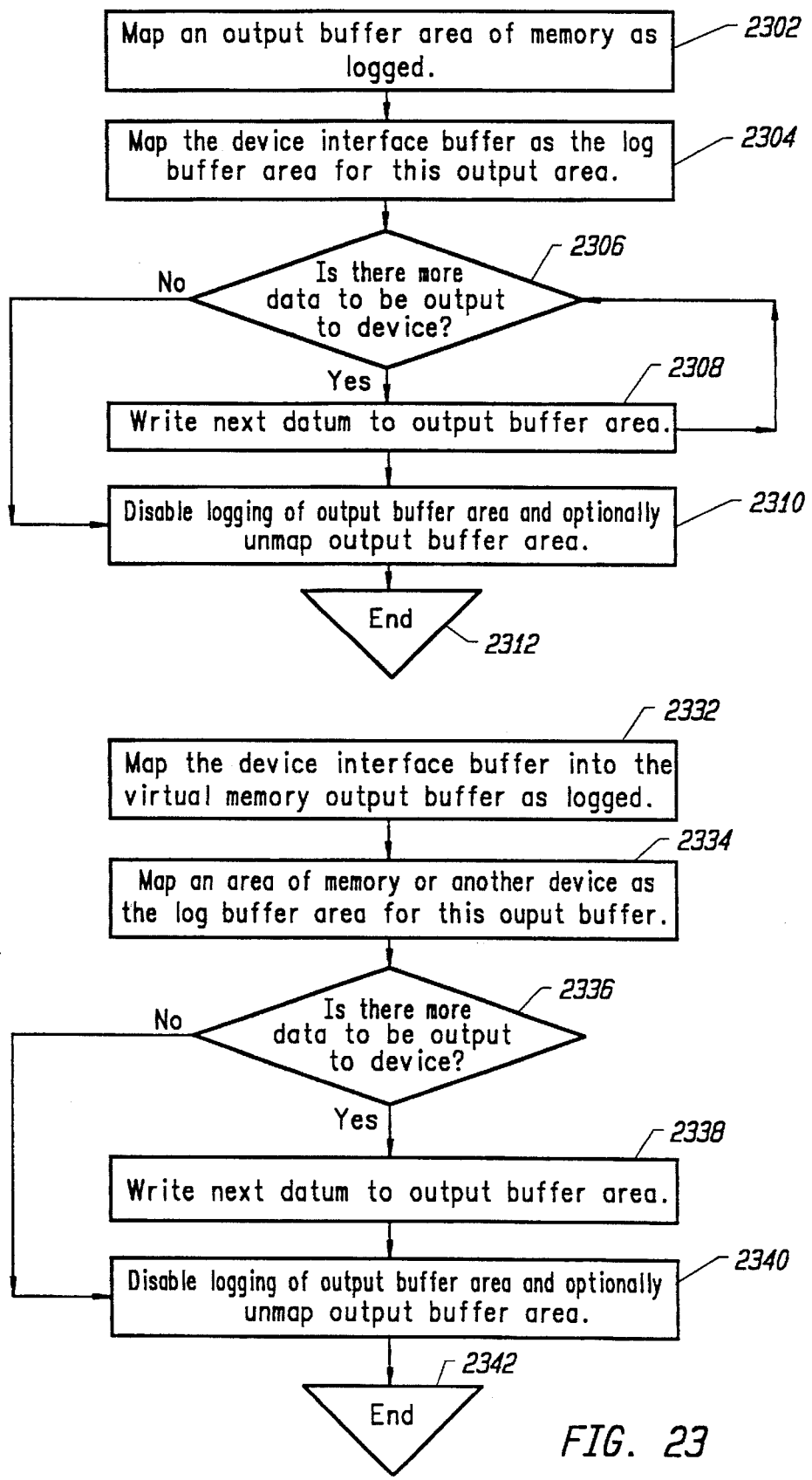
FIG. 23 shows flow diagrams giving the basic steps for transferring data to an output device using the logging mechanism, and for logging output to a device in a log buffer area.

FIG. 23(*a*) shows a flow diagram of outputting data to device using the configuration of FIG. 22. Block 2302 designates a region of memory, the output buffer, as logged. Block 2304 designates the device interface buffer 2214 as the log buffer for the output buffer. Decision block 2306 tests whether there is more data to be written to the output device. If there is more data to be written, control flows from decision block 2306 by the path with legend "Yes" to block 2308 which writes the next datum to the output buffer area and then returns control to decision block 2306. In a particular embodiment, the write to the output buffer is effected by the processor 2202 writing to an address contained in the output buffer memory. The cache 2204 then transfers the address/datum pair of the write operation through to the log block builder 2206 which includes the address/datum pair in a log block and transfers the log block to the log splitter 2208. The log splitter 2208 maps the address of the log block to an address contained in the bus address range of the device interface buffer 2214 and transfers the log block addressed to the address over bus 2210. The log block is received by device interface 2212 in its interface buffer 2214 and transferred to the attached device (not shown) over a device interconnect cable 2216. Referring to FIG. 22, the dotted line shows the transfer path of the device data.

Referring back to decision block 2306, if there is no more data to output to this device, control flows from decision block 2306 by the path with legend "No" to block 2310 which disables logging of the output buffer area and optionally unmaps the output buffer area. In a particular embodiment, this disabling of the logging and unmapping occurs are part of the conventional device file "close" operation, terminating access to the output device.

This method of device I/O differs from conventional memory mapped I/O in that data blocks, rather than individual word writes, are transferred to the output device. Moreover, in configurations fully implementing the log splitter, a copy of the output data can be retained in main memory, not just in the device interface buffer 2214. The device interface buffer may be too limited in size and possibly write-only because of hardware restrictions, precluding this memory from being used for subsequent reference to the output data.

In a particular embodiment including the log splitter, this mapping arrangement can also be reversed such that the output buffer maps directly to the device interface buffer 2214 and the log buffer is a separate area of memory, or even possibly a second device, using the method shown in FIG. 23(*b*). (This flow diagram repeats the steps of the flow diagram in FIG. 23(*a*) with the device buffer area and the memory area reversed, so for brevity the description is not repeated.) Using this arrangement, data written to the output buffer is transferred to the output device interface while a copy of this data is copied by the log mechanism to the log buffer area. For example, using the memory-based messaging support incorporated in the ParaDiGM architecture (referenced in the prior art), the memory-based messaging can be used to transfer the data to the device as well as signal these write operations while the logging mechanism can be used to retain a copy of the transmitted data. One use of this facility arises with network communication, in which the logged data can be used to generate retransmissions when the original data transmission is lost or corrupted.

While, for purposes of explanation, FIG. 22 shows only one processor and one device interface, it should not be inferred that only a single processor and a single device interface can be connected, for in some system configurations it may be desirable to include multiple processors and multiple device interfaces with device output from any processor to any device interface.

VIII. Device Input

Figure 24:
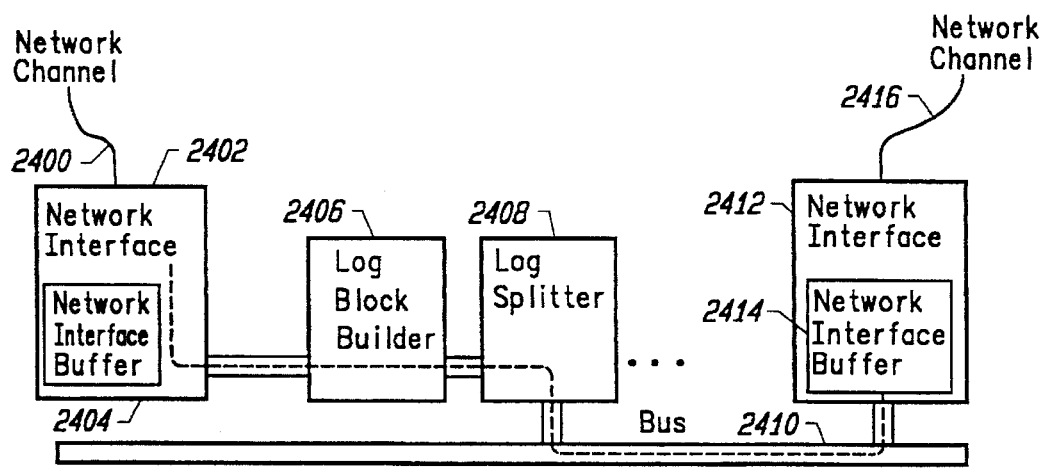
FIG. 24 shows the use of the logging mechanisms of the present invention for device input (and output) in the context of network switching.

The present invention can be used to demultiplex device input as well as device output, as illustrated in FIG. 24 in the context of network switching. The configuration and operation is similar to the device output configuration and operation described in FIG. 22 and Section 5.7 above.

Referring to FIG. 24, an input network channel 2400 is connected to a network interface 2402 which is attached to a buffer 2404 with logging support, similar to that described in Section 5.1. The buffer 2404 is attached to a log block builder 2406 which is attached to a log splitter 2408 which is attached to a bus 2410, such as the L1/L2 bus 432 of FIG. 4. A second network interface 2412 has a buffer 2414 which is attached to the bus 2410.

Directed by a network management module (not shown), a region of memory is designated as logged and the log mapping is set up so that the log buffer address range is contained in the address range of the bus addresses of the network interface buffer 2414. When a network packet arrives at network interface 2402 from network channel 2400, the packet is written into the logging network interface buffer 2404 at the address specified by: i) the packet, ii) its associated protocol and, iii) any address mapping facilities at the interface (not shown). The sequence of write operations corresponding to the packet causes the log block builder 2406 to produce a log block which is transferred to the log splitter 2408. The log block is mapped in either direct or indexed modes and written over the bus 2410 to the associated new address. Network interface buffer 2414 containing the address of the new block is updated by receiving the log block. In a particular embodiment, notification of reception is signaled using a memory-based notification/message facility, as described by Cheriton et al. in the ParaDiGM architecture (IEEE Computer February 1991). After reception and notification of the log block, network interface 2412 transfers the log block out over network channel 2416 after possibly some network protocol specific modifications. Referring to FIG. 24, the dotted line shows the transfer path of the network data.

The log block builder may be omitted if the device delivers data in blocks or the block building is not justified from a cost-performance standpoint. Similarly, the log splitter module can be omitted if the required mapping of data is minimal or null.

While, for purposes of explanation, FIG. 24 shows only two network interfaces and a transfer from one to the other, it should not be inferred that only two network interfaces can be connected or that the transfer can only occur to a single network interface at a time, for in some system configurations it may be desirable to include additional network interfaces, other processors and devices, and a block may be transferred over bus 2410 with an address such that the block is received by multiple network interfaces, caches and other device interfaces. The multiple interface reception supports multicast as part of the switching regime.

For simplicity, the log splitter 2408 is shown as directly connected to the log block builder 2406 rather than being connected to separate device, such as being connected to the L2 cache 322 in FIG. 3. In the latter interconnection scheme, the network output data would transfer once over the L1/L2 bus to reach the log splitter and possibly again with a mapped address to reach the network interface. In general, a variety of other interconnection configurations are possible without departing from the scope and spirit of the present invention.

Figure 25:
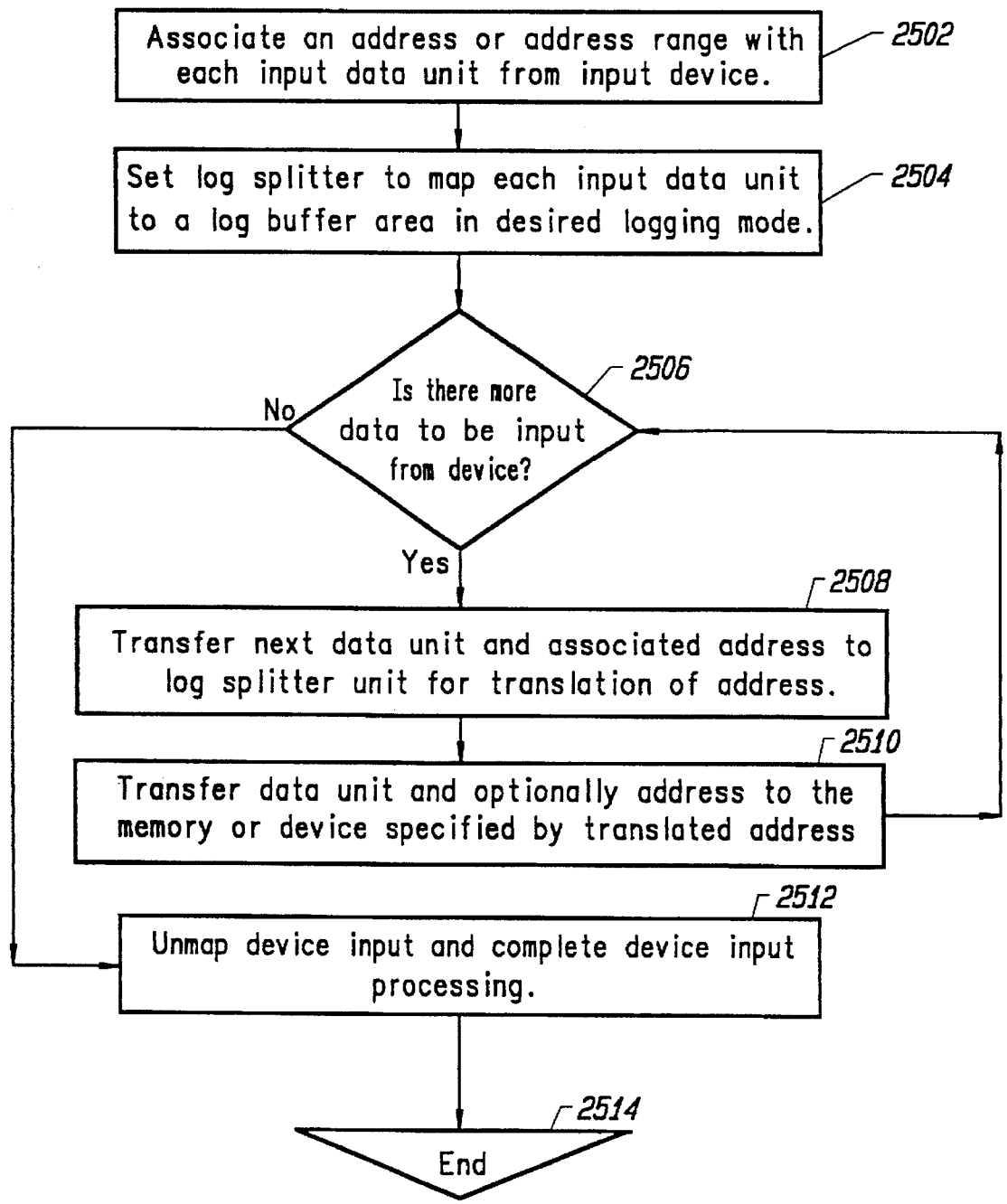
FIG. 25 shows a flow diagram giving the basic steps for demultiplexing, transferring and streaming the data from an input device using the logging mechanism.

More generally, device input is handled using the present invention as described in FIG. 25. Block 2502 associates an address or address range with each input data unit from the input device. For example, with a network interface device, the address range may be associated with a network connection or range of network addresses. With a simple device such as a multi-port serial interface, there may be a single address for each port. Block 2504 sets the log splitter associated with the input device to map input data units to the desired log buffer areas in the desired logging mode. For example, input from a network device would be mapped to the log buffer area corresponding to the network connection associated with the data. Different logging modes are used with different forms of network communication. With so-called real-time communication, direct mode can be used, so that the most recent packet at a given address overwrites the earlier packet at the log buffer address corresponding to the packet address, if this earlier packet has not yet been transmitted. With reliable communication in which all data must be reliably received in sequence, indexed mode is used so that each packet is received in a separate location, up to the limits of the local buffering. Real-time switching with direct logging mode would be applicable to the switching of digital video, as but one example use. The reliable communication switching would be applicable to file transfer, as but one example use. In general, the log splitter maps input data to different areas of memory or to a separate memory-mapped device.

Referring again to FIG. 25, decision block 2506 tests whether there is more data to be input from the device. If there is more data, control flows from decision block 2506 by the path with legend "Yes" to block 2508 which transfers the next data unit and associated address to the log splitter for translation of the address, the same as the use of the log splitter described in Section 5.3. Block 2510 transfers the data and optionally the translated address to the memory or device specified by the translated address. For example, the translated address may specify a log buffer area that is part of a output network device, thereby effecting networking switching from the input device to the output network device. Control then returns to decision block 2506. If decision block 2506 determines that there is no further input data, control flows from decision block 2506 by the path with legend "No" to block 2512 which unmaps the device input in the log splitter and completes the device input processing. In a particular embodiment, the mapping in the log splitter in block 2504 occurs as part of a device "open" operation and the unmapping occurs as part of a device "close" operation.

IX. Log-Based Consistency

The present invention provides memory consistency in a multiprocessor system, achieving the best properties of both write-through and write-back consistency approaches, the technique is referred to as log-based cache consistency.

Figure 26:
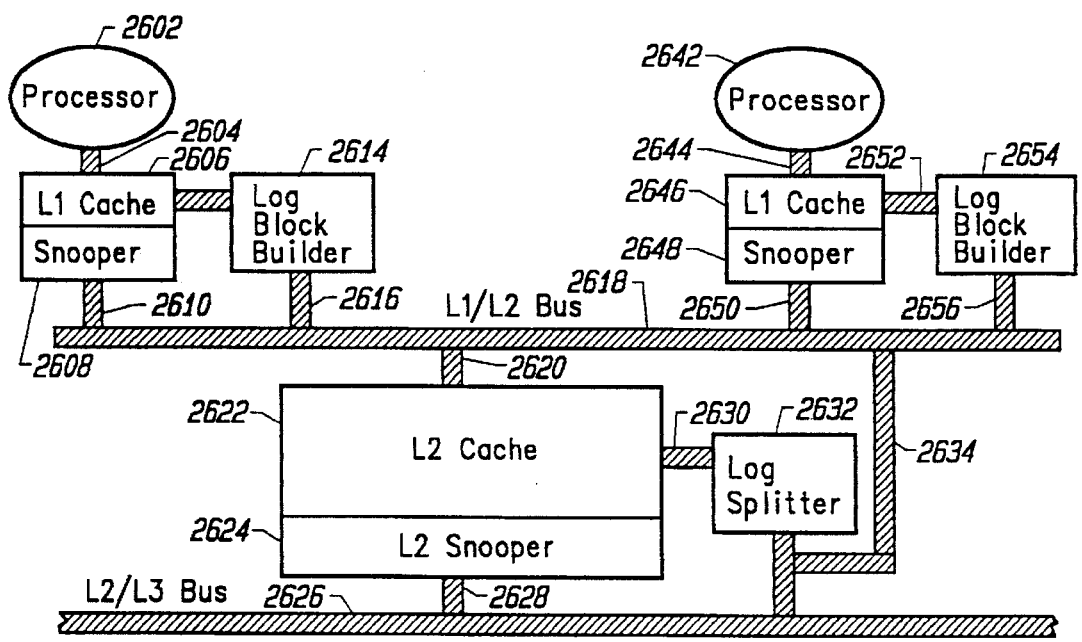
FIG. 26 shows the multiple processor organization with a processor, cache memory unit, log block builder, log FIFO and log splitter at the secondary cache level, where the L2/L3 bus either connects the L2 caches to memory or to another level of memory caching, or to I/O devices.

Referring to FIG. 26 illustrating a two-processor configuration as an extension of FIG. 3, a processor 2602 is connected by a bus 2604 to a first-level or L1 cache 2606 which includes a cache snooper component 2608 connected to a L1/L2 bus 2618 by a bus interconnect 2610. The L1 cache 2606 is connected by a bus 2612 to a log block builder (LBB) 2614 which is in turn connected to the L1/L2 bus 2618 by a bus interface 2616. A secondary or L2 cache 2622 is connected by a bus interface 2620 to the L1/L2 bus 2618 and through a L2 snooper 2624 and bus interface 2628 to a L2/L3 bus 2626. An interconnect 2630 connects L2 cache 2622 to a log splitter 2632. The log splitter connects by an interconnect 2634 to L1/L2 bus 2618 and L2/L3 bus 2626. Paralleling the processor 2602 and its cache and interconnections, a processor 2642 is connected by a bus 2644 to a first-level or L1 cache 2646 which includes a cache snooper component 2648 connected to a L1/L2 bus 2618 by a bus interconnect 2650. The L1 cache 2646 is connected by a bus 2652 to a log block builder (LBB) 2654 which is in turn connected to the L1/L2 bus 2618 by a bus interface 2656.

A region of memory that is to be maintained consistent in caches using log-based consistency is marked such that each cache line corresponding to a memory block in the region of memory has the WT, L and AU status control bits set in its corresponding status control word, as described in Section 5.1 and illustrated in FIG. 4, referring to cache line 416, status control word 410 and control tag bits 426, 428 and 430 respectively. As described above, these control tags can be maintained by the memory management unit or stored in the operating systems memory management data structures on a per-page or per-cache line basis.

Figure 27:
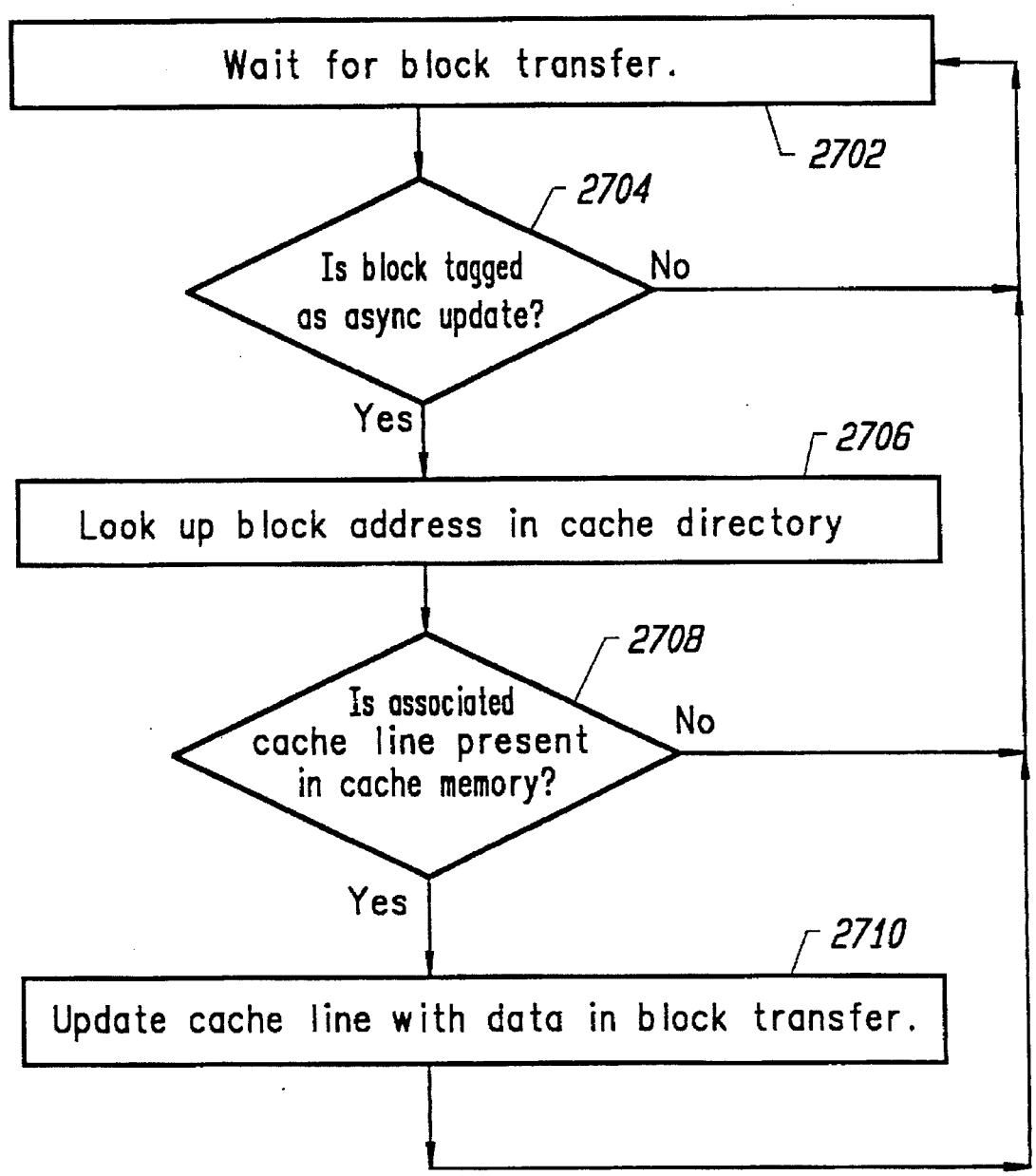
FIG. 27 shows a flow diagram giving the basic steps for asynchronously updating a cache memory from block transfers as part of a bus snooping mechanism.

Referring further to FIG. 26, snooper 2608 and snooper 2648 continuously watch bus 2618 for bus transfers with the asynchronous update tag set (not shown) using the method whose flow diagram is given in FIG. 27. Block 2702 waits for a block transfer over the bus 2618. When snooper 2648 observes such a bus transfer, decision block 2704 checks whether the transfer is indicated as performing asynchronous update. If it is not, control flows from decision block 2704 by the path with legend "No" to block 2702 which waits for the next block transfer. If it is marked for asynchronous update, control flows from decision block 2704 by the path with legend "Yes" to block 2706 which looks up the block address in the local cache 2646 to determined if the associated cache block is present. If the L1 caches are virtually addressed, the block address can be a virtual address or a physical address, a system design choice. If the L1 caches are physically addressed, the block address is a physical address. Decision block 2706 checks whether the designated cache block was found in the cache. If not, control flows from decision block 2708 by the path with legend "No" back to block 2702. If so, control flows from decision block 2708 by the path with legend "Yes" to block 2710 which updates the cache line data with the contents of the block. Control then returns to block 2702 which repeats the method for the next transmitted block transfer. Cache snooper 2648 can be designed with standard techniques such as a separate duplicate set of status control words describing the contents of the L1 cache 2646 to allow concurrent access by the snooper 2648 and the processor 2642.

When processor 2602 writes to a cache line marked as write-through and asynchronous update in L1 cache 2606, the address and datum of the write operation are output across interconnect 2612 to LBB 2614 which incorporates this pair into a block comprised of address and one or more data values, and outputs the block over interconnect 2616 to L1/L2 bus 2618. Snooper 2648 then receives and processes the block as described above.

As described for FIG. 3, concurrent with the bus transfer of this block and its processing by the snooper mechanisms, the L2 cache 2622 also receives this block from L1/L2 bus 2618 over bus interface 2620, updates the L2 cache contents with this data and, if the block is marked as logged, passes the block over bus 2630 to log splitter 2632, which then maps the log block to a log buffer address and transfers the block with the revised address, possibly including the original address, over interconnect 2634 to L1/L2 bus 2618. The revised log block can be transferred as an asynchronous update as well, in which case the revised log block is received by snooper 2608 which updates the cache line in L1 cache 2604 corresponding to the revised log block address, if this line is present. If the line is not present, the revised log block transmission is ignored by L1 cache 2604. Snooper 2648 behaves similarly. The L2 cache 2622 can similarly update its contents based on the log address of the log block.

Alternatively, a conventional cache consistency mechanism can be used for log block updates over the L1/L2 bus 2618 even if the original block update was generated with an asynchronous update designation. For example, the revised log block can be transferred over the L1/L2 bus 2618 without the asynchronous update tag and the L2 cache 2622 can simply update its memory and invalidate any copies of the affected memory blocks in caches 2606 and 2646 following a conventional invalidation-based consistency protocol.

The original block and the revised log block can be transferred down to the L2/L3 bus 2626 by interconnects 2628 and 2634 respectively. In this case, the update can be propagated to subsequent peer level L2 caches attached to the L2/L3 bus 2626 using techniques comparable to that described for the L1/L2 bus 2618. For example, considering FIG. 26 further, if another L2 cache (not shown) transmits a block over the L2/L3 bus 2626 marked for asynchronous update, the L2 snooper 2624 checks if the corresponding line is present in its L2 cache 2622 and updates this line if so. This update can be effectively propagated to L1 caches 2606 and 2646 by the L2 cache transferring the block over the L1/L2 bus 2618 as an asynchronous update.

More generally, the propagation of the asynchronous update can continue to additional lower levels of the memory if so desired. However, because the log splitting normally only occurs at the one level, namely the L2 level in the configuration shown in FIG. 26, the additional memory levels do not produce additional distinct block addresses at which the updates need to be performed. It is possible for the log buffer area to be itself logged, in which case updates to the log buffer area produce log blocks corresponding to updates to the log buffer area for the first log buffer area. This "recursive" logging would produce additional log blocks, but again at the L2 memory level.

As an alternative to asynchronous updating, a conventional cache Consistency mechanism can be used between L2 caches on the L2/L3 bus 2626. For example, the L2 cache 2622 can simply acquire ownership of the cache block corresponding to the revised log block using a conventional cache consistency protocol over the L2/L3 bus 2626, coordinating with other L2 caches (not shown) on this bus.

The asynchronous updating method allows other processes, caches and devices to see updates incrementally without requiring strict synchronization between the updating cache and the receiver(s) of updates. This update mechanism appears adequate in several situations, an example being the updating of an indexed log buffer area by a single source. Because the log buffer area is only updated at the end, each receiver only sees the current or a slightly earlier state of the log and the delay between log write and update at the receiver is insignificant. However, the asynchronous updating method does not provide conventional cache consistency, which is required in other situations.

To implement cache consistency, a particular embodiment can implement an ownership protocol on the cache lines as follows. There is an O ownership tag 420 per cache line. Each processor must have the O ownership tag set in the cache line containing a memory block before it can access data contained in that memory block. The processor must have exclusive ownership, as further indicated by the W tag 422 before it is allowed to write to the memory block. When a processor 2602 attempts to gain ownership of a memory block, it transmits a request for ownership over bus 2618. When the requesting cache receives a response indicating it has been assigned ownership of the cache block, the memory access by the processor is allowed to proceed.

Figure 28:
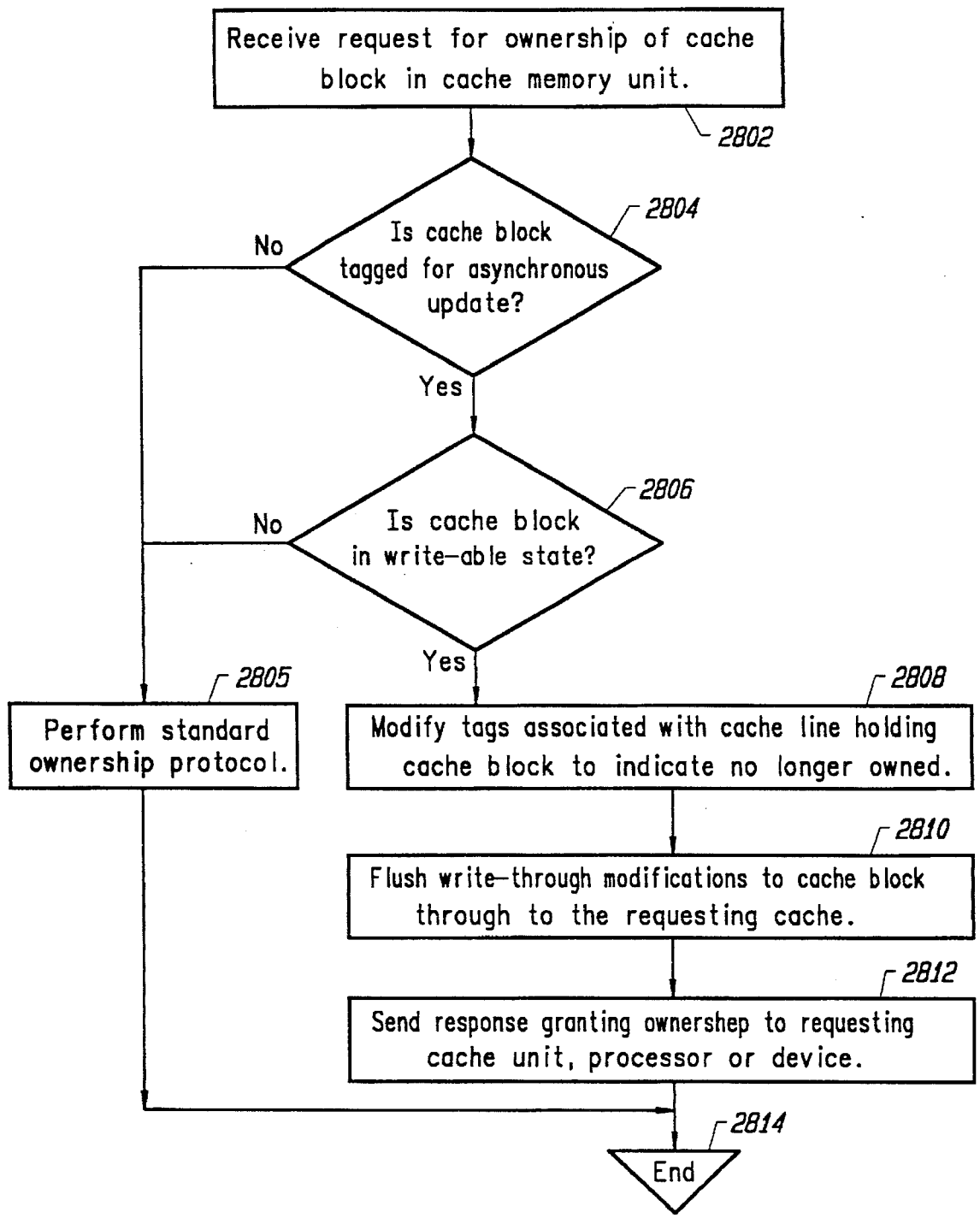
FIG. 28 shows a flow diagram giving the basic steps for transferring ownership of a cache line in a log-based consistency protocol.

If the requested cache line is not tagged for asynchronous update or is not owned exclusively by another cache, the ownership transfer follows the conventional cache ownership protocol. Otherwise, the ownership transfer serves to flush changes to the requested cache block as part of the ownership transfer, rather than necessarily directly transferring the cache line data as part of the ownership transfer. FIG. 28 shows a flow diagram for this latter method of ownership transfer for the cache memory unit receiving the ownership transfer request.

Referring to FIG. 28, block 2802 receives a request for ownership of the cache block. Decision block 2804 checks whether that cache block is tagged for asynchronous update. If not, control flows from decision block 2804 by the path with legend "No" to block 2805 which performs the standard cache ownership protocol. This protocol basically includes marking the cache line as invalid (or shared if the request was for non-exclusive ownership), transferring the entire cache line to the requestor if it has been modified, and notifying the requestor that it now has the requested ownership.

If the requested cache block is tagged for asynchronous update, control flows from decision block 2804 by the path with legend "Yes" to decision block 2806. Decision block 2806 checks whether the requested cache block is marked as writeable, which is normally equivalent to being exclusively owned. In a particular embodiment, tag 422 provides this indication for the cache line containing the requested cache block. If the cache block is not writeable, control flows from decision block 2806 by the path with legend "No" to block 2805 which performs a standard ownership protocol, as described above. If the cache block is writeable, control flows from decision block 2806 by the path with legend "Yes" to block 2808 which modifies the tags associated with the cache line holding the block to indicate that it is no longer owned. In a particular embodiment, this action entails resetting the O 420 and W 422 tags in the status control word 410 associated with the cache line 416 holding the requested cache block. This action prevents the processor 2602 from subsequently accessing this cache line in the L1 cache 2606. Block 2810 flushes the write-through modifications to this cache block through to the requesting cache. Block 2812 sends a response to the requesting cache, granting it ownership of the requested cache block. Block 2814 then terminates the procedure. In a particular embodiment, the flushing of the write-thorough modifications and the sending of the response are combined into a single transmission from the requested cache to the requesting cache.

Thus, using log-based consistency and the modified ownership protocol, each processor has a consistent view of memory relative to the actions of other processors, as with conventional cache consistency protocols. However, the latency for ownership transfer is substantially reduced as is the Mount of data transferred, assuming that only a portion of a cache line is modified between ownership transfers.

The above description applies for the implementation of strictly consistent shared memory. Variations on consistency, including so-called delayed and release consistency can also be accommodated by suitably relaxing the transferring of ownership protocol. Moreover, the ownership transfer need not be imposed in specialized caches where access to a reasonably recent version (as opposed to the absolutely most recent version) may be adequate. For example, a frame buffer may be implemented as a cache that is updated by logged writes by other processors. There is generally no need for the frame buffer cache to have strictly consistent access to memory, given that inconsistencies are expected to be short relative to the screen refresh rate. Other I/O device interfaces may feasibly use the same relaxation or omission of the basic ownership protocol. For example, output to a device interface can be handled through the logging mechanisms described above, without a full consistency mechanism in the device interface, because the device interface may not update the data it receives.

Figure 29:
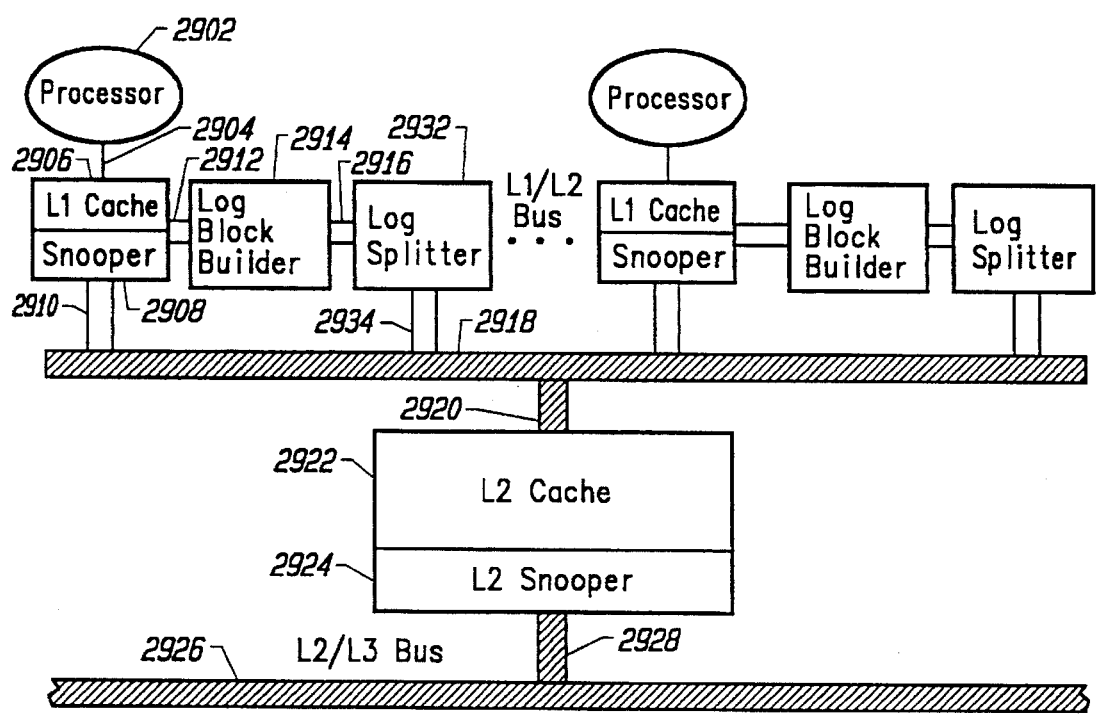
FIG. 29 shows the basic system organization with a per-processor log block builder (as in FIG. 26) but a per-processor log splitter.

FIG. 29 shows an alternative configuration in which there is a log splitter 2932 for each processor 2902 and L1 cache 2906. In this configuration, the log splitter 2932 writes each log block over bus 2918 tagged as asynchronous update both in its original form as received from log block builder 2914 as well as in its revised form resulting from the log splitter translation and address inclusion. The transfer of the log block in its original form over bus 2918 is handled the same as the similar transfer described over bus 2618 for FIG. 26. The transfer of the revised block corresponds to transfer of the revised block over bus 2618 in FIG. 26. This brief description shows that the configuration of FIG. 29 can also support log-based consistency. The per-processor log splitter may reduce L1/L2 bus traffic for regions of memory not marked for asynchronous update although it does not reduce bus traffic for regions of memory marked for asynchronous update (and thus log-based consistency) in the embodiment we have described above.

For simplicity of description, log-based consistency has been described for configurations of two processors only, with the processors connected by a bus, such as the L1/L2 bus 2618 in FIG. 26. A larger number and variety of processors and interconnection mechanisms are possible without departing from the spirit and scope of the present invention.

I. Conclusion

The present invention has several advantages over the conventional approach to prior data logging systems. For example, the data logging support provided by the present invention avoids the extra processor memory operations in which the processor must explicitly write the address and datum value to a separate log area in addition to the normal write operation. With memory operations being the most expensive in modern processors, this saving is significant. Further, it eliminates the development cost and space cost for the programmer or language translator to insert operations to perform this explicit data logging. The extra instructions required for data logging in the conventional approach can also reduce program performance by requiring the use of extra processor registers for, for example, address calculation and by increasing the size of program code and thereby reducing the benefit of the processor instruction cache. These extra instructions may have to dynamically check whether the update needs to be logged, as in the case of updating through a pointer. Because of the complexity of this mechanism, there is greater risk of incomplete logging of updates compared to that provided by the present invention. Still further, it eliminates the cost of software-based synchronization on access to a data log that is potentially shared by several processors. In particular, if multiple processors are writing to the same log, there must otherwise be a locking mechanism that ensures that each write datum and address is appended to the end of the log and the end of the log is updated without inconsistency even when two processors attempt to perform the update at the same time. Also, it allows logging to be turned on and off during an execution if desired with no run-time overhead, such checking before each logging write as is required in a pure software scheme. Turning logging on and off during program execution is important to minimize the amount of data collected during program debugging. It is also an important optimization in an optimistically executed parallel simulation where logging can be eliminated for the furthest behind process because the process need never be rolled back. Further, the facility of the present invention avoids the time cost of logged data written into the processor cache forcing other data that the processor will more likely subsequently access out of the cache, increasing the processor's cache miss rate and thereby significantly decreasing processor performance. With logged data, there is a low expectation of reaccessing the data before it is flushed from the cache, negating one of the primary benefits of caching. Finally, it avoids the time cost of loading log memory blocks into the cache as they are written.

Compared to using this conventional software-based scheme but with the log buffer area in a non-cached area of memory, the present invention avoids the time cost of the individual log write operations going directly over the memory bus to relatively slow main memory. As provided by the present invention, the address/datum pairs of a logged write are buffered and built into log blocks, thereby insulating the processor from bus and memory delays, reducing the number of bus and memory operations, and exploiting the efficient block transfer capability of modern busses and memory systems.

The facility provided by the present invention has several advantages over the schemes in which write references to a logged area of memory are trapped by memory management hardware on a per-page basis. It avoids the hardware and operating systems cost of handling a page trap on every logged data write, a cost that exceeds 3 thousand instruction times with conventional operating systems. Also, it avoids the time cost and software mechanism to synchronize logged data writes by multiple processors to the same data log. Finally, it avoids the time cost arising from poorer cache behavior or non-cached behavior of executing the extra instructions and data writes required by this conventional approach, similar to that described above for the other conventional approach.

The log copy mechanism has several advantages over the established scheme for copy-on-write implementation. It avoids the overhead on the processor, cache and memory busses of explicitly copying an entire page at the time that any datum in the entire page is written. A conventional processor copy operation in computer system using memory caches results in significant movement of data into and out of the cache, often forcing useful data out of the cache to accommodate extraneous data contained in the page being copied. With the increasing size of virtual memory pages, this conventional approach is expected to become more expensive. In contrast, the log copy mechanism of the invention performs the copy as a side-effect of cache load and writeback, incurring no extra bus or cache traffic. Also, the log cache allows the copy to take place on a cache line granularity, providing a finer-grain indication of updates to the destination segment than the conventional page-based scheme. Also, the present invention allows for cache-line granularity of copy without requiring a virtually addressed cache and software control of the cache management mechanisms. In particular, the more common physically addressed and hardware managed cache is accommodated.

The present invention provides several advantages over conventional approaches for rollback and recovery. The log copy mechanism in combination with the log copy reset provides an efficient means to restore the state of a computation to that preserved in a checkpoint segment. Conventional approaches require that the data of the checkpoint segment be copied to the computation state segment explicitly, normally with no knowledge of which portions of the state have been modified, thus requiring a copy of the entire checkpoint. With the increasing size of computational state, this approach is increasingly expensive. Also, the combination of fine-grain, low-cost data logging of updates, the availability of the addresses of these updates (as provided by the addressed indexed mode of logging) and the ability to apply these updates to the state segment, allows a rollback to recover the state to a specific point in the execution, rather than just the last checkpoint state. In conventional approaches, the cost of making a checkpoint precludes frequent checkpointing, because all the (modified) data in the state segment must be located and copied on a page granularity to the checkpoint segment. Thus, a rollback in conventional systems typically results in a significant loss of computational state because the rollback goes back to the last checkpoint, rather than to the desired point in execution. This issue can complicate real-time control systems that interact with the outside world because actions on the outside world cannot be rolled back. Thus, such actions must be queued for execution at the next checkpoint so there is no danger of the computation rolling back prior to the execution of such undo-able actions. In addition, the combination of the fine-grain low-cost data logging of updates in combination with the mapped write access to the checkpoint segment allows fine-grained update of the checkpoint segment, reducing the cost of rollback because then fewer updates need to be applied to the state segment to update it after a log copy reset to the desired rollback point. In contrast, a conventional checkpoint scheme requires the copying of all the computational state, or all the computational state that has been modified on a page granularity, and thus cannot be performed frequently, and without the logging provided by the present invention, there is no means to incrementally update the checkpoints so created.

The present invention provides several advantages over conventional approaches to high-performance device output. Firstly, compared to non-cached writing to devices, the present invention avoids the time cost of the processor waiting for each write operation to the device over the bus to complete, as occurs with synchronous uncached write operations. Secondly, it reduces the bus overload of such access by building blocks from individual write operations, thereby exploiting the efficient block transfer provided by most modern buses and reducing the number of bus transactions. Finally, it reduces the time cost for the processor to read data written to such a device because the data can be cached. Some systems use an extended write buffer for uncached data to reduce the first problem, but only this invention deals with the second two issues.

In contrast to the approach of mapping the device to cached memory and explicitly flushing the cache data to device memory, the present invention provides several advantages. It avoids the time and instruction space overhead of explicit cache flushing, which, as a protected operation with many processors, incurs the overhead of an operating system call as well as the flush operation itself. It also avoids dependence on the variations in support for cache flushing provided by current processors. In particular, some processors do not provide selective flushing of the on-chip (L1) cache but only the ability to invalidate the entire cache, making this approach too expensive for device output. In some cases, the cache flushing mechanism also invalidates the flushed data in the cache, making it expensive for the processor to subsequently read the data, limiting the benefits of the data caching. It also allows a unbounded stream of data to be produced while only using a small amount of cache memory. In particular, the output buffer region can be set to be logged in indexed mode so that the data output to the device is sequentially addressed even though the output is generated by repeatedly writing the same output buffer region. Thus, a single page of data could be used in the cache to generate an unbounded stream of data, rather than having to map a region of memory as large as the stream of data or repeatedly change the mapping. For example, a large framebuffer could be mapped as the log buffer area and overwritten using a single page of memory contained in the cache using this logging technique. Finally, it allows the data going to the device to be forced into a sequentially addressed stream within a desired address range, using the indexed logging mode. This restriction avoids the complexity, time and space cost of synchronizing the cache writeback behavior with the device so that either the cache cannot writeback a cache line to the device as part of normal cache line replacement or the device can accept partially written, multiply written and out-of-order written cache lines.

In the configuration in which the device is memory-mapped and logged to a separate area, the invention allows efficient logging of data output to the device for debugging, recovery and performance monitoring, the same advantages for other memory-mapped activity.

The present invention provides several advantages over the conventional approaches to device input demultiplexing. Firstly, in contrast to a conventional software-implemented scheme, it avoids the time overhead of the processor being interrupted, inspecting a received data unit, mapping it to a memory buffer or device, and then copying the data to this location. Secondly, it avoids the extra bus overhead that results from the data being copied through the caches and busses several times. In particular, in this conventional approach applied to network switching, the data must move from the network interface to the processor cache and then from the processor cache to the outgoing network interface thus costing at least two bus transfers. Thirdly, in contrast to the specialized hardware approach that exists in prior art, the present invention avoids the development and manufacturing cost of extra special hardware. The log block builder and the log splitter can be viewed as components that will become standard components of the memory systems in the future based on their uses for logging, device I/O and cache consistency. The logging block builder (re)creates blocks for efficient bus and link transfer and buffers write operations, minimizing bus overhead and transfer latency. The log splitter provides a simple mapping mechanism that allows data to be moved directly to a designated memory area or device, minimizing the data copying. It also supports real-time (corresponding to direct log mode) and sequenced (corresponding to indexed log mode) device communication. Finally, the integration with caching allows the device interface buffering to effectively use main memory as backing store, just as is done with processor caches. Thus, as a further example in the networking switching context, if an output interface falls behind transmitting packets written to its output buffer, these packets are effectively stored in main memory and only brought into the output interface's cache when it references this data in preparation for transmission. In contrast, prior art network interfaces have a fixed and limited amount of memory on-board which must be managed explicitly at the attendant extra cost in software complexity and execution overhead.

The present invention provides several advantages over the conventional approaches to cache consistency in multiple cache configurations. Firstly, it reduces the read and write bus traffic that occurs with conventional write-back or invalidate cache consistency protocols when there is a high degree of write sharing —write operations by different processors to the same memory block in relatively close sequence. This cost in the conventional approach is significantly increased by the trend to using larger cache line sizes, which are cost-beneficial for uniprocessors. In particular, with a conventional invalidation consistency protocol, each attempt by one processor to write to a memory block not currently owned by the processor must invalidate the entire memory block in all other caches, possibly causing the current exclusively owning processor to write back the line if the cache line is currently exclusively owned and modified by another such processor. Normally, the entire cache line is written back even if only a portion of the line was modified. Similarly, the entire cache line must be reread on subsequent access by another processor even if only a small portion of the line was modified. With the approach provided by the present invention, only the modified words of the cache line are transferred and no significant complexity is added to the cache directory mechanism. Secondly, the approach of the present invention minimizes the latency for consistency actions during processor execution. In particular, a processor requesting ownership of a cache line need typically only wait for an acknowledgement of ownership of the cache line, rather than waiting for a full data transfer of the cache line data, as occurs with the conventional schemes. Finally, the logged based consistency of the present invention can co-exist with either or both of the conventional consistency mechanisms when applied to separate portions of memory. For instance, conventional write-back ownership consistency could be applied to data that is private or has a low degree of write-sharing while the logged-based consistency can be reserved for data with a high degree of write-sharing.

Log-based consistency also allows a simple implementation of a useful form of relaxed consistency with minimal overhead. In particular, by eliminating the ownership synchronization, a cache receiving log updates is still consistent with the source cache except for the time required for memory transfer through the log block builder, log splitter and bus, which is a smaller time interval than generally observable in most applications.

In general, the present invention provides major functional and performance improvements over the prior art in simple, powerful and novel extensions to the apparatus and methods that form a contemporary digital computer memory system.

While a particular embodiment of the invention has been shown and claimed, it should be clearly understood that the invention is not limited to the specific embodiment shown herein. Many modifications may be made without departing from the spirit and scope of the invention. The description of a specific embodiment is not meant to limit the scope of the invention. It is contemplated and specifically stated that the applicant's invention covers all such modifications and alternatives to the specific embodiment shown which may fall within the words and spirit of the appended claims, including embodiments partially or totally in hardware. It is to be fully understood that all of the foregoing is intended to be merely illustrative and is not be to construed or interpreted as being restrictive or otherwise limiting of the present invention, including the spirit and scope of the invention as set forth in the following claims.

What is claimed is:

1. In a digital computing system of the type including one or more individual processor units each including instruction acquisition and instruction execution means, and one or more cache memory units for storing a predetermined number of blocks of information from at least one memory source, a method comprising the steps of:

referencing a portion of said memory source by one of said individual processor units;

selecting a cache line in a cache;

loading said referenced portion of said memory source and associated status bits into said cache, said status bits retrieved from said memory source or another cache supplying cache line data;

setting a selected indication in said cache based on said status bits; and if one of said status bits is set, updating a modified portion of said data external to said memory source when said cache line data is updated.

2. A method as recited in claim 1 wherein said status bit is a logged status bit, said method further comprising the step of:

logging updates to the cache external to the cache, the method comprising the steps of:

on memory reference to the cache, mapping the address of the memory reference and a datum value contained therein and determining whether the referenced cache line is in the cache and loading it into the cache if not;

checking whether the memory reference is a read operation, and if so, returning the datum value;

updating the cache line with a written datum value at the specified address; and checking whether the cache line is indicated as write-through and generating an output transmission of the referenced address and datum value.

3. The method as recited in claim 2 wherein said output further comprises control signals indicating the state of other flags associated with the cache line.

4. A method as recited in claim 1 further comprising logging updates of a source memory segment to a destination memory segment in a physically addressed cache, the method comprising:

referencing an address not contained in the cache;

allocating a cache line in the cache;

testing whether cache data in the allocated line has been modified and if so, writing back the cache data, updating a cache status control word in a next-level cache so that a source address matches a destination physical address, wherein said source address and said destination physical address are determined by a source/destination mapping;

loading the cache data into the allocated cache line from a source address specified in a next-level cache control status word corresponding to the referred address; and setting an address associated with the cache line to a destination physical address of the referenced address.

5. A method as recited in claim 1 wherein said step of setting a selected indication in said cache comprises the step of setting a logged indication if a logged status bit is associated with said cache lines, wherein said logged indication controls whether an operation on said cache is to be logged.

6. A method as recited in claim 1 wherein said step of setting a selected indication in said cache comprises the step of setting an asynchronous update indication if an asynchronous update status bit is associated with said cache line.

7. The method as recited in claim 1 wherein said associated status bits are retrieved by the steps of:

referencing a portion of memory whose address translation entry is not in an address translation unit;

selecting and writing back the contents of an address translation entry if modified; and loading referenced address translation information into the address translation unit.

8. The method as recited in claim 1 wherein said selected indication in said step of setting a selection indication determines a location among a plurality of selections external to said memory source.

9. The method as recited in claim 1 wherein said data in said step of updating a modified portion of said data external to said memory source, is updated at the time said cache data is update.

10. The method as recited in claim 1 wherein an address of said updated data is a physical address.

* * * * *